(12) United States Patent
Nuzman

(10) Patent No.: US 10,826,559 B2
(45) Date of Patent: Nov. 3, 2020

(54) ECHO CANCELLATION IN A MULTIPORT DATA TRANSCEIVER

(71) Applicant: Nokia Solutions and Networks OY, Espoo (FI)

(72) Inventor: Carl Nuzman, Union, NJ (US)

(73) Assignee: Nokia Solutions and Networks OY, Espoo (FI)

( * ) Notice: Subject to any disclaimer, the term of this patent is extended or adjusted under 35 U.S.C. 154(b) by 275 days.

(21) Appl. No.: 15/980,865

(22) Filed: May 16, 2018

(65) Prior Publication Data

US 2019/0356353 A1 Nov. 21, 2019

(51) Int. Cl.
*H04B 3/23* (2006.01)
*H04B 1/40* (2015.01)
*H04L 5/14* (2006.01)

(52) U.S. Cl.
CPC ............. *H04B 3/237* (2013.01); *H04B 1/40* (2013.01); *H04L 5/14* (2013.01)

(58) Field of Classification Search
CPC .................................................. H04B 3/237
See application file for complete search history.

(56) References Cited

U.S. PATENT DOCUMENTS

| 9,020,364 B2 | 4/2015 | Xie et al. |
| 2006/0055594 A1 | 3/2006 | McConnell et al. |
| 2009/0052683 A1 | 2/2009 | Schwingshackl et al. |
| 2016/0352369 A1* | 12/2016 | Smith .................. H04B 1/1036 |
| 2018/0081047 A1* | 3/2018 | Gander ................ H04B 17/101 |

FOREIGN PATENT DOCUMENTS

EP 3016309 B1 10/2017

OTHER PUBLICATIONS

Gil-Cacho, Jose Manuel, "Adaptive Filtering Algorithms for Acoustic Echo Cancellation And Acoustic Feedback Control in Speech Communication Applications," Ph.D. Theses, KU Leuven, 2013, 257 pages.

(Continued)

*Primary Examiner* — Samina F Choudhry
(74) *Attorney, Agent, or Firm* — Mendelsohn Dunleavy, P.C.; Yuri Gruzdkov

(57) ABSTRACT

A multiport FDX data transceiver having (i) digital transmit and receive chains shared by the multiple ports thereof and (ii) a multi-stage echo-cancellation circuit capable of canceling the echo of the transmitted signal that is coupled back into the receive chain through the analog front end of the transceiver. In an example embodiment, the echo-cancellation circuit comprises two stages. The first stage operates to remove a dominant echo signal corresponding to the output signal that is being broadcast on the multiple ports of the transceiver. The second stage operates to remove a residual echo signal typically caused by differences in the pertinent characteristics of the circuits associated with the different ports of the transceiver. In some embodiments, the multi-stage echo-cancellation circuit can be used for training a single-stage echo-cancellation circuit that may be unable to sufficiently quickly converge on an optimal set of filter coefficients on its own.

20 Claims, 12 Drawing Sheets

(56) References Cited

OTHER PUBLICATIONS

"Digital Communication," Chapter 20, Echo Cancellation, www.ece.gatech.edu, 2004 [retrieved on May 3, 2018] Retrieved from the Internet: <URL: http://barry.ece.gatech.edu/digital/supp/20echo.pdf> pp. 945-970.

Hamzeh, Belal, "Full Duplex DOCSIS Technology over HFC Networks," 2016, Spring Technical Forum Proceedings, (5 pages).

"Adaptive Algorithms for Mimo Acoustic Echo Cancellation," www.researchgate.net, 2004 [retrieved on Apr. 27, 2018] Retrieved from the Internet: <URL: https://www.researchgate.net/publication/226472700_Adaptive_Algorithms_for_Mimo_Acoustic_Echo_Cancellation> (31 pages).

"Data-Over-Cable Service Interface Specifications DOCSIS® 3.1—Cable Modem Operations Support System Interface Specification"—CM-SP-CM-OSSIv3.1-I11-171220, https://community.cablelabs.com, 2017 [retrieved on Apr. 25, 2018] Retrieved from the Internet: <URL: https://community.cablelabs.com/wiki/plugins/servlet/cablelabs/alfresco/download?id=d69fbcc0-bb23-45b0-966d-146f3c3a66ec> (297 pages).

"Data-Over-Cable Service Interface Specifications DOCSIS® 3.1—Physical Layer Specification"—CM-SP-PHYv3.1-l13-171220, https://community.cablelabs.com, 2017 [retrieved on Apr. 25, 2018] Retrieved from the Internet: <URL: https://community.cablelabs.com/wiki/plugins/servlet/cablelabs/alfresco/download?id=f5b22f10-d0b8-41c7-9f19-b477f3aa9bed;1.0> (295 pages).

Fermo, Andrea et al., "Analysis of Different Low Complexity Nonlinear Filters for Acoustic Echo Cancellation," Journal of Computing and Information Technology, CIT 8, 2000, 4, pp. 333-339.

Extended European Search Report for corresponding European application No. 19174131.3; dated Sep. 20, 2019.

\* cited by examiner

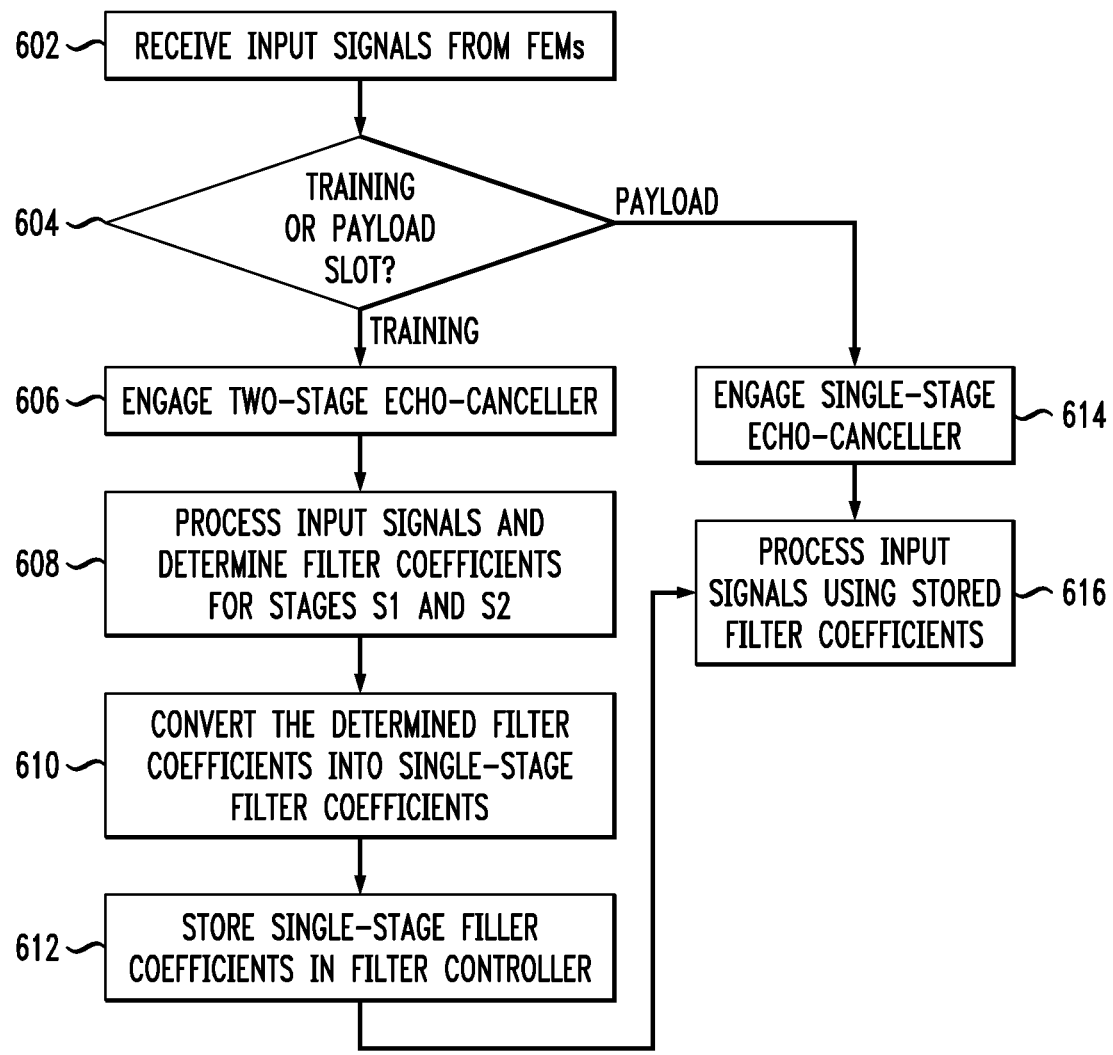

800

1000

ECHO CANCELLATION IN A MULTIPORT DATA TRANSCEIVER

BACKGROUND

Field

Various example embodiments relate to communication equipment and, more specifically but not exclusively, to methods and apparatus that can be used for echo cancellation in full-duplex data transceivers.

Description of the Related Art

This section introduces aspects that may help facilitate a better understanding of the disclosure. Accordingly, the statements of this section are to be read in this light and are not to be understood as admissions about what is in the prior art or what is not in the prior art.

A full-duplex (FDX) communication system supports concurrent transmissions on the upstream and downstream channels in the same frequency band. In such a system, interference cancellation is typically used to reduce (e.g., cancel out) self-interference at the transceiver. The self-interference occurs when a high-power transmitted signal interferes with the relatively low-power received signal(s) due to limited isolation between the transceiver's transmit and receive signal paths and/or ports. Self-interference cancellation can be performed in the analog domain, in the digital domain, or using a combination of both.

SUMMARY OF SOME SPECIFIC EMBODIMENTS

Disclosed herein are various embodiments of a multiport FDX data transceiver having (i) digital transmit and receive chains shared by the multiple ports thereof and (ii) a multi-stage echo-cancellation circuit capable of substantially fully canceling the echo of the transmitted signal that is coupled back into the receive chain, e.g., through the analog front end of the transceiver. In an example embodiment, the echo-cancellation circuit comprises two stages. The first stage operates to remove a dominant echo signal corresponding to the transmitted signal that is being broadcast on the multiple ports of the transceiver. The second stage operates to remove a residual echo signal typically caused by the existing differences in the pertinent characteristics of the circuits associated with the different ports of the transceiver.

Advantageously, the multi-stage architecture of the echo-cancellation circuit enables the stage controllers to quickly converge on an optimal set of filter coefficients and quickly react to the changing echo-channel conditions.

In some embodiments, the multi-stage echo-cancellation circuit can be used for training a single-stage echo-cancellation circuit that may be unable to sufficiently quickly converge on an optimal set of filter coefficients on its own, e.g., due to the echo channel of the multiport data transceiver being characterized by a relatively large value of the condition number.

According to an example embodiment, provided is an apparatus comprising a data transceiver that comprises an analog front end having a plurality of ports, a digital transmit chain, and a digital receive chain, the digital transmit chain being configured to drive the analog front end to cause an output signal to be transmitted on the plurality of ports with some energy of the output signal being coupled through the analog front end into the digital receive chain as an echo signal; wherein the data transceiver further comprises a first echo-cancellation circuit having at least a first stage and a second stage connected in series, the first echo-cancellation circuit being configurable to cancel the echo signal in response to a plurality of monitor signals received from the analog front end; wherein the first stage comprises a plurality of first adaptive filters, each of the first adaptive filters having a respective feed-through path and a respective first tap, each of the respective first taps being connected to receive one of the plurality of monitor signals, one of the respective feed-through paths being connected to receive a data signal generated in response to one or more input signals received on the plurality of ports, and other ones of the respective feed-through paths being connected to receive other ones of the plurality of monitor signals; and wherein the second stage is connected to receive signals outputted by the respective feed-through paths of the plurality of first adaptive filters.

BRIEF DESCRIPTION OF THE DRAWINGS

Other aspects, features, and benefits of various disclosed embodiments will become more fully apparent, by way of example, from the following detailed description and the accompanying drawings, in which:

FIG. 6 shows a flowchart of an echo-cancellation method that can be implemented in the echo-cancellation circuit of FIG. 5 according to an embodiment;

DETAILED DESCRIPTION

Data Over Cable Service Interface Specification (DOCSIS) is an international telecommunications standard that permits the addition of high-bandwidth data transfer to an existing cable-television system. It is employed by many cable-television operators to provide Internet access over their existing cable-plant infrastructure. DOCSIS 3.1 Full Duplex is a relatively recent development directed at improving the spectral efficiency of the DOCSIS-compatible systems by enabling the use of the full spectrum (e.g., from ~0 MHz to ~1.2 GHz) of the cable plant at the same time in both upstream and downstream directions. The corresponding physical-layer specifications are laid out, e.g., in the DOCSIS 3.1 document CM-SP-PHYv3.1-I13-171220, which is incorporated herein by reference in its entirety.

At least some embodiments disclosed herein are compatible with DOCSIS 3.1.

Figure 1:
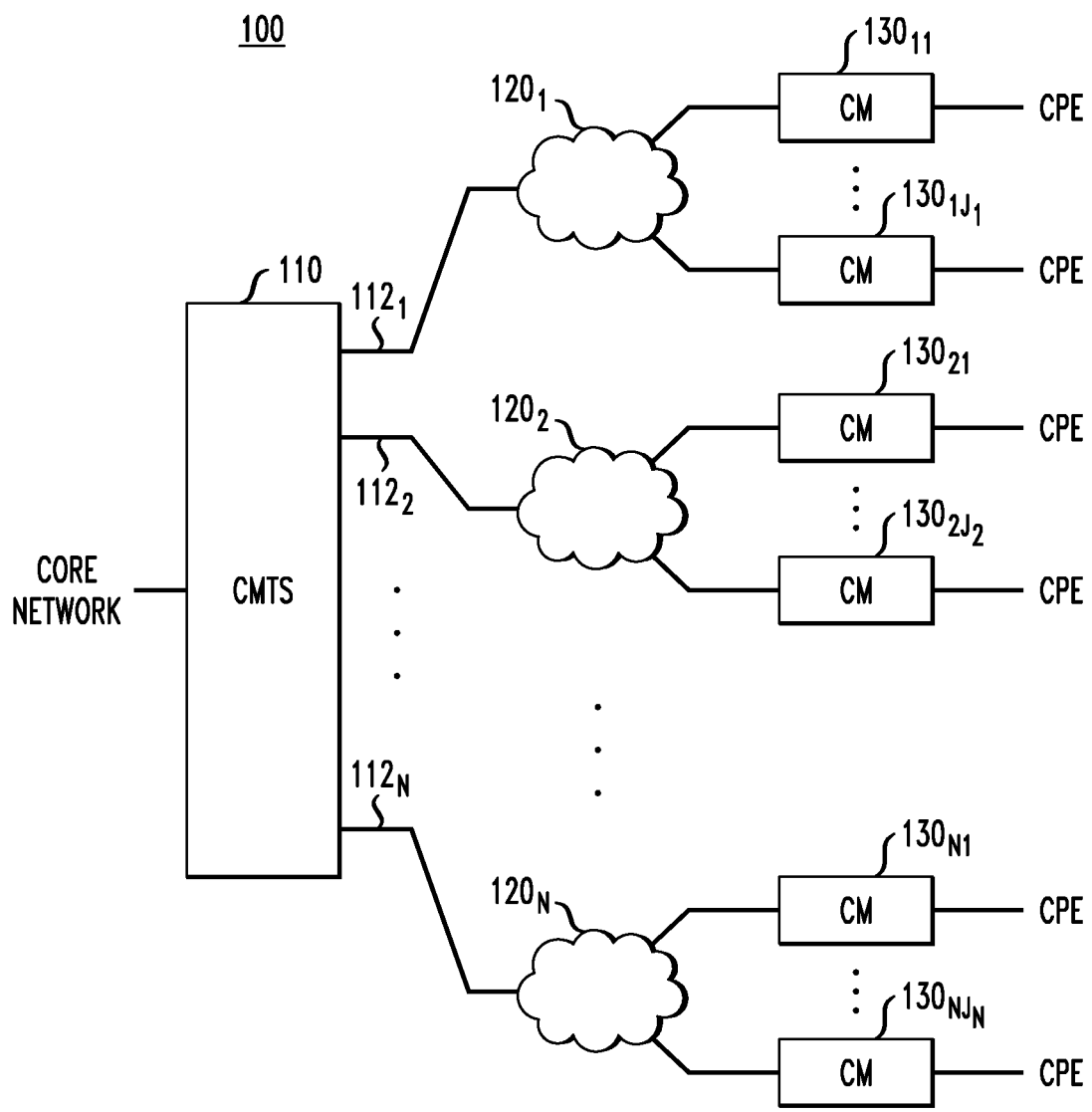
FIG. 1 shows a block diagram of a communication system according to an embodiment.

FIG. 1 shows a block diagram of a communication system 100 according to an embodiment. System 100 comprises an access node 110 (also sometimes referred to as the "Cable Modem Termination System," CMTS) and a plurality of cable modems (CMs) $130_{nj}$ connected using distribution plants $120_1$-$120_N$ as indicated in FIG. 1, where n=1, 2, . . . , N and j is a positive integer. In an example embodiment, the number N can be in the range between 2 and 10.

In an example embodiment, a distribution plant $120_n$ comprises a broadband bidirectional shared-media transmission system or network architecture that uses coaxial cables.

Each cable modem 130 operates to connect one or more respective sets of consumer-premises equipment (CPE) to the corresponding one of the distribution plants $120_1$-$120_N$, e.g., by bridging data packets between them. For illustration purposes and without any implied limitations, FIG. 1 shows an embodiment in which each cable modem 130 is connected to a single respective set of CPE. In an alternative embodiment, some or all of the cable modems 130 can be connected to two or more respective sets of CPE.

In some embodiments, the CPE sets can be (i) implemented as respective standalone devices, e.g., as indicated in FIG. 1, and (ii) connected to cable modems 130 using the CM's local-area network (LAN) interfaces. In some other embodiments, a CPE set can be embedded with the corresponding cable modem 130 in a single physical device. An example CPE set may be configured to use IPv4, IPv6, or other suitable forms of Internet-protocol (IP) addressing. Example CPE sets may include but are not limited to gateways, home routers, set-top devices, personal computers, etc.

Each distribution plant $120_n$ is configured to connect $J_n$ cable modems $130_{nj}$ to a corresponding port $112_n$ of access node 110, where each $J_n$ is a positive integer. In some embodiments, all of the numbers $J_1$-$J_N$ may be different. In some other embodiments, at least some of the numbers $J_1$-$J_N$ may be the same.

Access node 110 is configured to connect the operator's back-office and/or core network to distribution plants $120_1$-$120_N$. More specifically, access node 110 may function to forward data packets between these two domains. In some embodiments, access node 110 may also function to forward data packets between upstream and downstream channels of different distribution plants $120_n$. Example embodiments of data transceivers and echo-cancellation circuits that can be used to implement access node 110 are described in more detail below in reference to FIGS. 2-10.

In an example embodiment, system 100 has a Full-Duplex (FDX) capability. As such, access node 110 is configured to support simultaneous upstream and downstream communications over each FDX carrier/tone. This feature is enabled by the use of appropriate self-interference- and echo-cancellation techniques, some examples of which are described in more detail below in reference to FIGS. 3-10.

Cable modems $130_{nj}$ are configured to operate in a frequency-division-duplexing (FDD) mode, wherein, on any FDX channel, the cable modem is either transmitting in the upstream or receiving in the downstream, but not both at the same time. Access node 110 can allocate FDX channels to cable modems $130_{nj}$ by providing access to upstream and downstream channels through FDD. A cable modem's operation on an FDX channel in either upstream or downstream can be changed by way of an appropriate control signal from access node 110 or from any other competent entity or through the use of appropriate scheduling. FDX channels can be bonded with non-FDX channels and with other FDX channels.

To reduce the risk of co-channel interference (CCI) and adjacent-channel interference (ACI) between cable modems 130, access node 110 typically operates to schedule transmissions and grants such that a cable modem does not transmit at the same time as other cable modems that are susceptible to these types of interference are receiving. For this purpose, cable modems 130 may be sorted into interference groups (aka transmission groups), e.g., by placing cable modems that are susceptible to interfering with one another into the same interference group. Access node 110 can then be configured to schedule transmissions and grants such that a cable modem of an interference group is not allowed to transmit when any other cable modems of the same interference group are receiving.

Figure 2A:
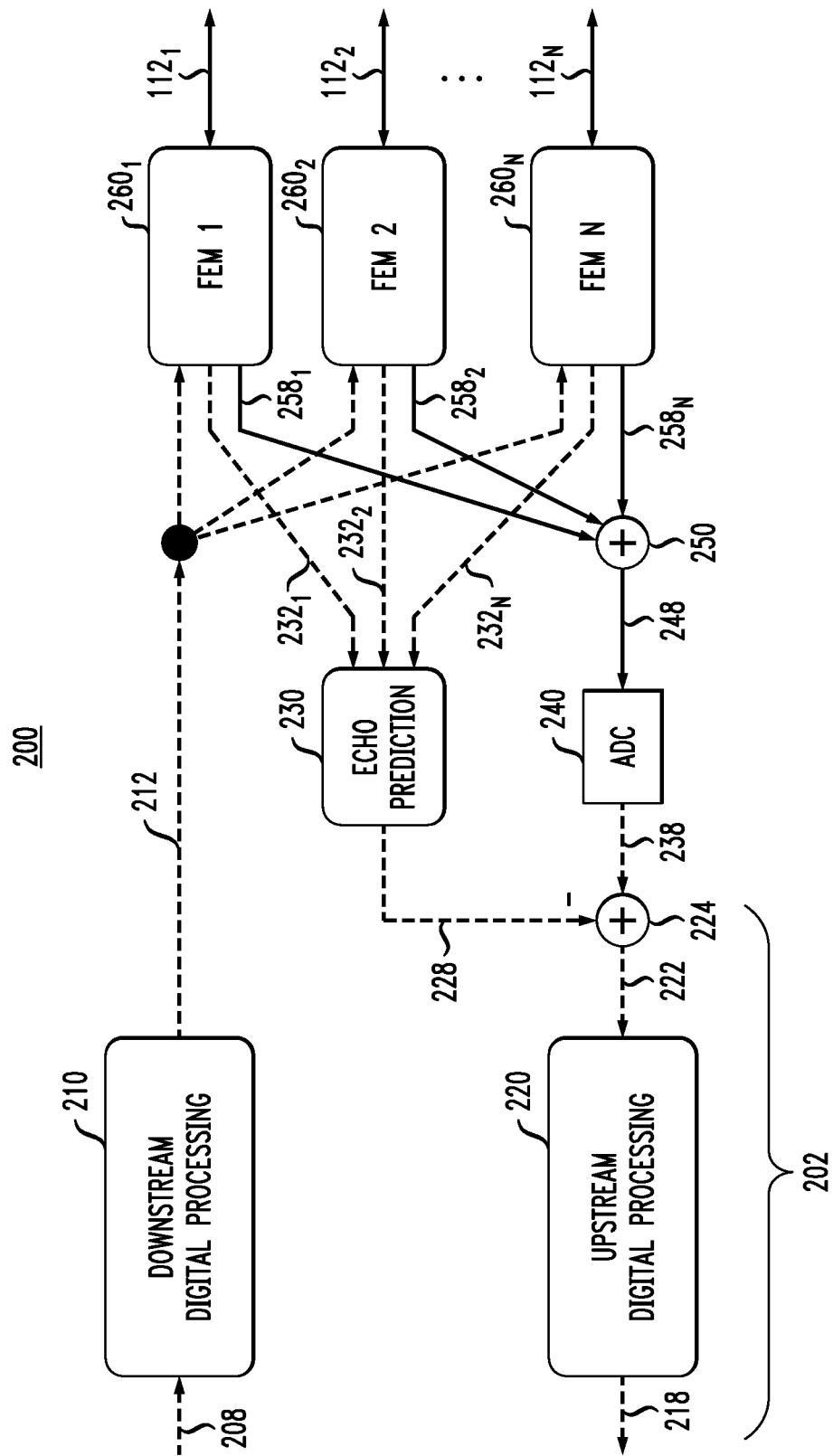
FIGS. 2A-2B show block diagrams of a multiport data transceiver that can be used in the communication system of FIG. 1 according to an embodiment.
Figure 2B:
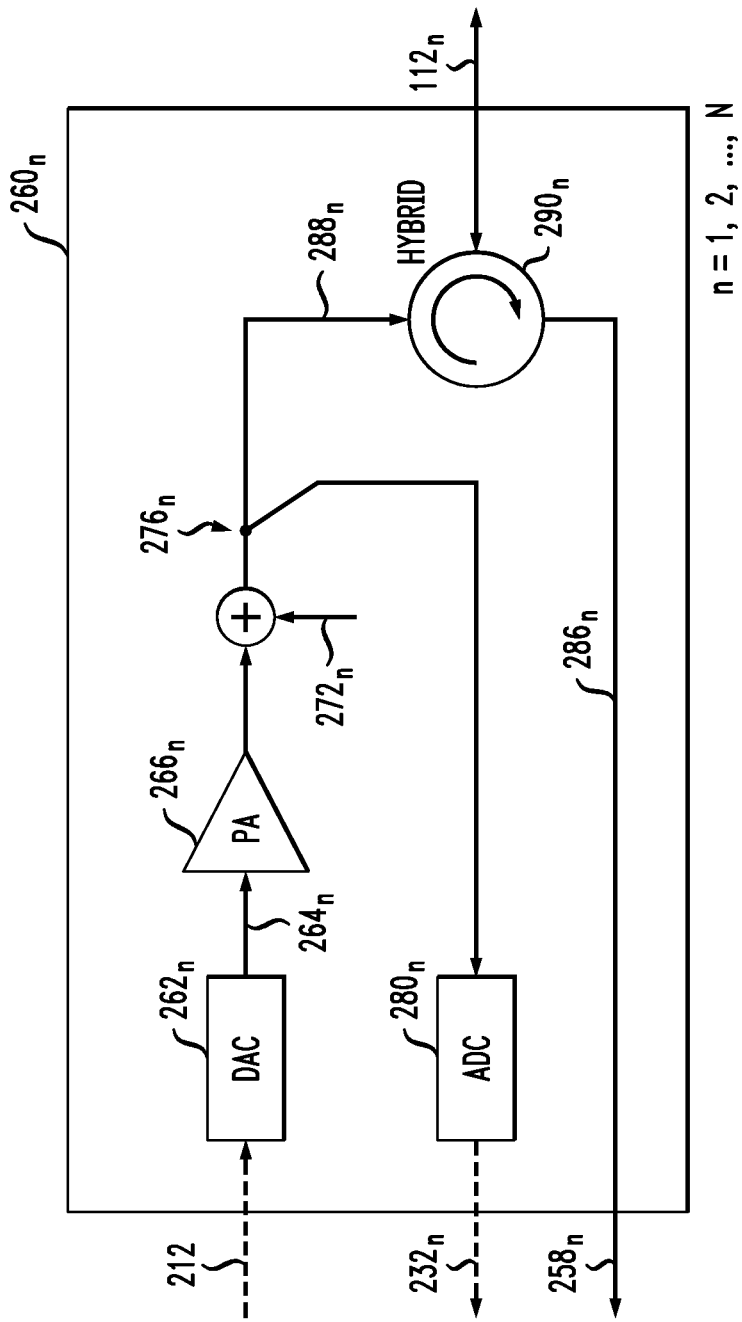

FIGS. 2A-2B show block diagrams of a multiport data transceiver 200 that can be used in access node 110 (FIG. 1) according to an embodiment. More specifically, FIG. 2A shows an overall block diagram of transceiver 200. FIG. 2B shows a block diagram of a front-end module (FEM) $260_n$ used in transceiver 200, where n=1, 2, . . . , N. In FIGS. 2A-2B, digital and analog signals are shown using dashed and solid lines, respectively.

Referring to FIG. 2A, transceiver 200 comprises a digital signal processor (DSP) 202 that includes a digital transmit chain 210 and a digital receive chain 220. Chains 210 and 220 are connected to each of FEMs $260_1$-$260_N$ in a manner that enables DSP 202 to provide signal processing for all signals transmitted and received through ports $112_1$-$112_N$. The shared-DSP configuration is beneficial, e.g., because it can be used to significantly reduce the cost of transceiver 200.

In operation, digital transmit chain 210 generates a digital signal 212 in response to an input data signal 208. N copies of digital signal 212 are then applied to FEMs $260_1$-$260_N$ for transmission of the corresponding analog electrical signals through ports $112_1$-$112_N$ (also see FIG. 1). As a result, transceiver 200 can operate to broadcast signal 212 in the downstream direction on multiple ports thereof.

Digital receive chain 220 is configured to generate an output data signal 218 in response to a digital signal 222 that is generated using a signal combiner 250 coupled to each of FEMs $260_1$-$260_N$ as indicated in FIG. 2A. In operation, signal combiner 250 generates an analog electrical signal 248 by combining analog electrical output signals $258_1$-$258_N$ generated by FEMs $260_1$-$260_N$, respectively, in response to receiving respective upstream transmissions through ports $112_1$-$112_N$. An analog-to-digital converter (ADC) 240 converts analog electrical signal 248 into digital form, thereby generating a corresponding digital signal 238. An adder 224 then operates to subtract a digital signal 228 from digital signal 238, thereby generating digital signal 222.

In an alternative embodiment, the ADC 240 can be moved to and distributed within the FEMs $260_1$-$260_N$, and the signal combiner 250 can be replaced by a corresponding digital-domain signal combiner.

Digital signal 228 is generated by an echo-prediction circuit 230 in response to receiving digital signals $232_1$-$232_N$ from FEMs $260_1$-$260_N$. Echo-prediction circuit 230 operates to generate digital signal 228 in a manner that causes digital signal 222 to be substantially free of the deleterious effects of self-interference caused, e.g., by signal reflections in distribution plants $120_n$ and the "leakage" of output signals $288_1$-$288_N$ through electrical hybrids $290_1$-$290_N$ back into analog electrical signals $258_1$-$258_N$ (see FIG. 2B). In some embodiments, echo-prediction circuit 230 can be a part of DSP 202.

Referring to FIG. 2B, an FEM $260_n$ comprises a digital-to-analog converter (DAC) $262_n$, a power amplifier (PA) $266_n$, an ADC $280_n$, and an electrical hybrid $290_n$. In operation, DAC $262_n$ converts the received copy of digital signal 212 into analog form, thereby generating an analog electrical signal $264_n$. Power amplifier $266_n$ amplifies signal $264_n$, thereby generating signal $288_n$. Electrical hybrid $290_n$ then operates to apply signal $288_n$ to port $112_n$ for downstream transmission through the corresponding distribution plant $120_n$ (also see FIG. 1).

Power amplifier $266_n$ typically causes signal $288_n$ to contain a noise component $272_n$, which is indicated in FIG. 2B by showing that the noise component is being added at the output of the power amplifier. Due to amplifier nonlinearities and fabrication variances, even nominally identical power amplifiers $266_n$ tend to impose different respective noise components $272_n$, which causes signals $288_n$ generated by different FEMs $260_n$ to differ from one another despite being generated in response to the same digital input signal, i.e., signal 212. A small portion of signal $288_n$ is tapped off using an electrical coupler $276_n$ and applied to ADC $260_n$, which then converts it into digital form, thereby generating the corresponding digital signal $232_n$. Hereafter, digital signal $232_n$ may be referred to as "monitor signals."

Electrical hybrid $290_n$ further operates to direct electrical signals received at port $112_n$ to an output $286_n$ thereof. As already indicated above, the hybrid output $286_n$ may also receive a small portion of signal $288_n$ due to limited electrical isolation between the different ports of the corresponding electrical hybrid $290_n$ and/or due to a small portion of the signal $288_n$ transmitted on port $112_n$ being reflected back to that port by the plant $120_n$. The electrical signal received at the hybrid output $286_n$ is the above-mentioned signal $258_n$ (also see FIG. 2A).

For illustration purposes and without any implied limitations, the following description of various echo-cancellation circuits is given assuming that system 100 is configured to operate using orthogonal frequency division multiplexing (OFDM). For clarity, the operation of the various echo-cancellation circuits is described for a single OFDM subcarrier. From the provided description, a person of ordinary skill in the art will understand, without any undue experimentation, how to make and use echo-cancellation circuits capable of handling multiple OFDM subcarriers.

In various embodiments, the adaptive filters used in the disclosed echo-cancellation circuits can be frequency-domain filters or time-domain filters. A person of ordinary skill in the art will understand that filter coefficients used in the functionally equivalent frequency-domain and time-domain filters are related and will be able to interconvert them as known in the pertinent art. As an example, U.S. Pat. No. 9,020,364 provides formulas that relate filter coefficients of a time-domain finite-impulse-response (FIR) filter and the corresponding frequency-domain filter, which patent is incorporated herein by reference in its entirety.

Figure 3:
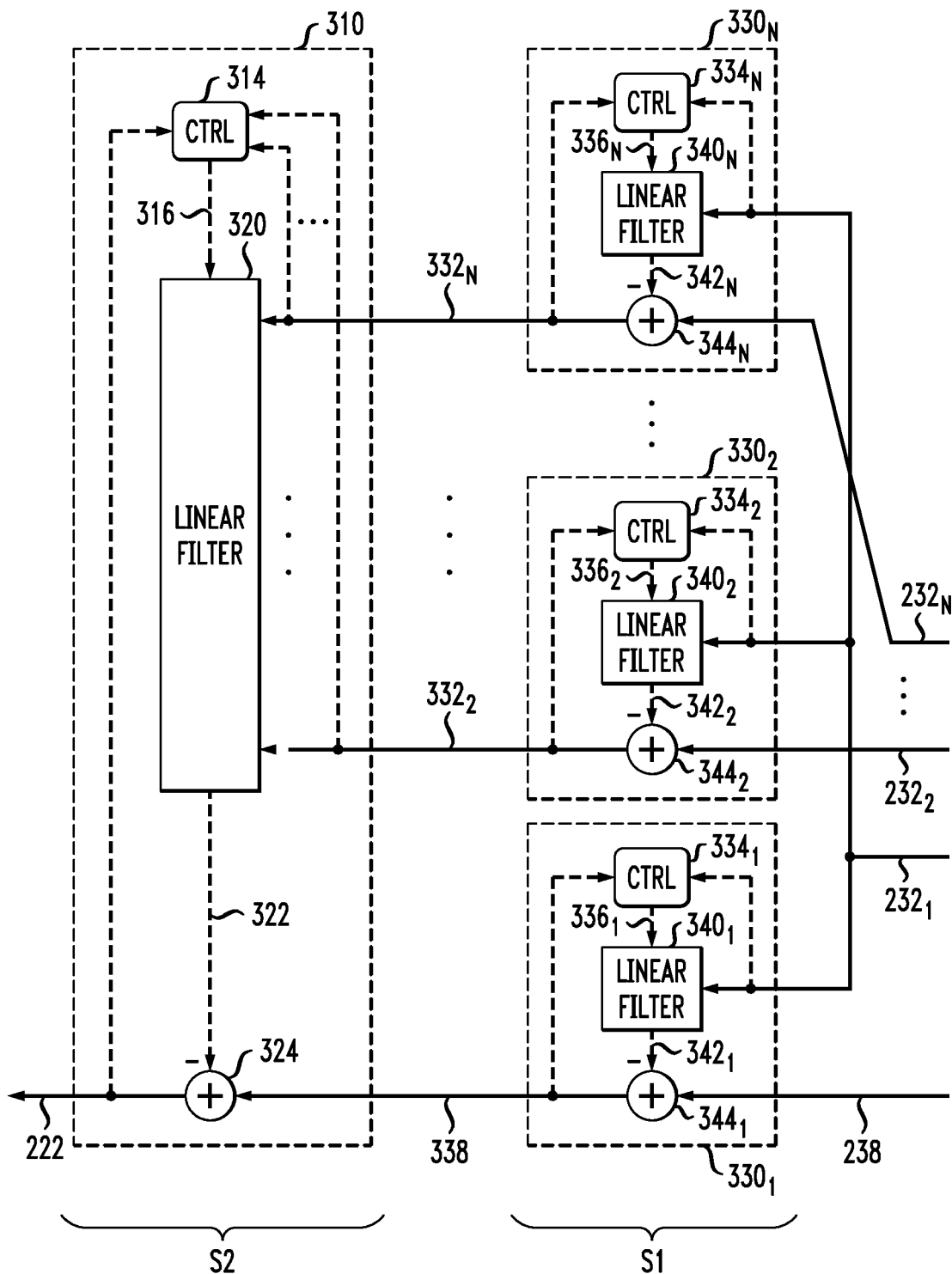
FIG. 3 shows a block diagram of an echo-cancellation circuit that can be used in the multiport data transceiver of FIG. 2 according to an embodiment.

FIG. 3 shows a block diagram of an echo-cancellation circuit 300 that can be used in transceiver 200 (FIG. 2) according to an embodiment. More specifically, circuit 300 can be used to implement the combination of echo-prediction circuit 230 and adder 224 in transceiver 200 (see FIG. 2A). Digital signals 238, $232_1$-$232_N$, and 222 are also shown in FIG. 3 to better illustrate the relationship between the circuits shown in FIGS. 3 and 2A.

Circuit 300 comprises two echo-cancellation stages denoted as S1 and S2. Stage S1 is configured to receive (N+1) digital signals, i.e., digital signals 238 and $232_1$-$232_N$. In response to the (N+1) received digital signals, stage S1 generates N digital output signals that are denoted in FIG. 3 using the reference numerals 338 and $332_2$-$332_N$. Stage S2 is configured to generate digital signal 222 in response to the N digital signals 338, $332_2$-$332_N$ received from stage S1.

Stage S1 comprises adaptive filters $330_1$-$330_N$. Each adaptive filter $330_n$ (where n=1, 2, ..., N) comprises a scalar linear filter $340_n$, a corresponding filter controller (CTRL) $334_n$, and an adder $344_n$ located in the feed-through path of the adaptive filter.

As used herein, the term "scalar" refers to the fact that each of filters $340_n$ has a single tap and operates on the corresponding single input. In the shown embodiment, each of filters $340_n$ receives, as an input, a respective copy of digital signal $232_1$.

Each controller $334_n$ generates a respective control signal $336_n$ for the corresponding filter $340_n$ using a suitable algorithm directed at minimizing the "error" in the output signal generated by the corresponding adaptive filter $330_n$. In an example embodiment, the error can be determined by (i) scaling signal $232_1$ and (ii) evaluating the effect of the resulting scaled signal on the respective output signal. The output signal generated by adaptive filter $330_1$ is the digital signal 338. The output signals generated by adaptive filters $330_2$-$330_N$ are the digital signals $332_2$-$332_N$, respectively. Suitable error-minimization algorithms that can be used in filter controllers $334_1$-$334_N$ for this purpose are known in the pertinent art and include (but are not limited to) the recursive-least-squares (RLS) algorithm, the least-mean-square (LMS) algorithm, and the affine projection algorithm (APA).

In response to control signal $336_n$, filter $340_n$ appropriately scales digital signal $232_1$, thereby generating a respective echo estimate $342_n$. Adder $344_n$ then removes the echo estimate $342_n$ from the corresponding pass-through signal. More specifically, adder $344_1$ is configured to remove the echo estimate $342_1$ from the digital signal 238, thereby generating the digital signal 338. Each of adders $344_2$-$344_N$ is configured to remove the respective one of echo estimates $342_2$-$342_N$ from the respective one of digital signals $232_2$-$232_N$, thereby generating the respective one of digital signals $332_2$-$332_N$.

Stage S2 comprises an adaptive filter 310. Adaptive filter 310 comprises a vector linear filter 320, a corresponding filter controller (CTRL) 314, and an adder 324 located in the feed-through path of the adaptive filter.

As used herein, the term "vector" refers to the fact that filter 320 has multiple taps and operates on the corresponding (vector of) multiple inputs. In the shown embodiment, the inputs to filter 320 are digital signals $332_2$-$332_N$ generated by stage S1 as described above.

Controller 314 generates a control signal 316 for the filter 320 using a suitable algorithm directed at minimizing the "error" in the output signal 222 generated by the adaptive filter 310. In an example embodiment, the error can be determined by (i) variously scaling signals $332_2$-$332_N$ and (ii) evaluating the effect of the sum of the resulting scaled signals on the digital signal 222. Suitable error-minimization algorithms that can be used in filter controller 314 for this purpose are known in the pertinent art and include the above-mentioned RLS algorithm, the LMS algorithm, the APA, etc.

In response to control signal 316, filter 320 computes a sum of appropriately scaled digital signals 332$_2$-332$_N$, thereby generating a residual-echo estimate 322. Adder 324 then removes the residual-echo estimate 322 from the digital signal 338, thereby generating the digital signal 222.

In an example embodiment, the signal processing implemented in stages S1 and S2 of echo-cancellation circuit 300 can be conceptualized as follows.

Stage S1 operates to remove a dominant echo signal representing digital signal 212 that is being broadcast downstream on ports 112$_1$-112$_N$ (also see FIGS. 2A-2B). In the shown embodiment, digital signal 232$_1$ is used as an estimate of that dominant echo signal. In an alternative embodiment, any one of digital signals 232$_2$-232$_N$ can similarly be used as an estimate of the dominant echo signal.

Stage S2 operates to remove a residual echo signal that remains after the removal of the dominant echo signal performed by stage S1. The residual echo signal is usually present due to the typically existing differences in the pertinent electrical characteristics of FEMs 260$_1$-260$_N$. For example, such differences may include variances among power amplifiers 266$_1$-266$_N$, variances among electrical hybrids 290$_1$-290$_N$, etc. Such differences typically cause different ones of FEMs 260$_1$-260$_N$ to generate (slightly) different echo signals, which are then combined by signal combiner 250 and appear collectively in digital signal 238. An example mathematical model that can be used to approximate these circuit processes is described below in reference to FIG. 4.

Figure 4:
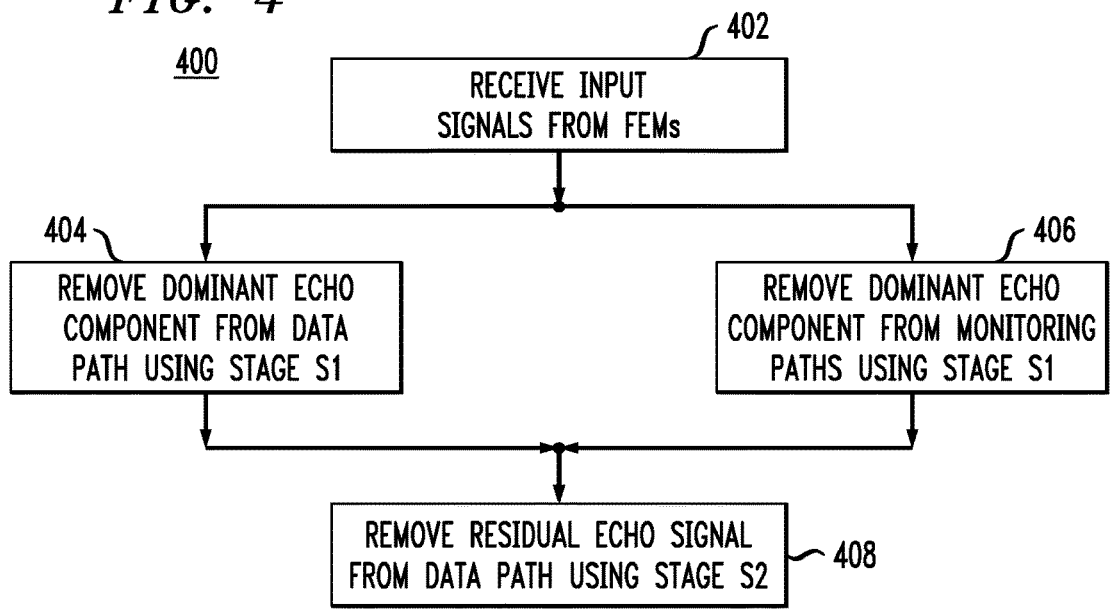
FIG. 4 shows a flowchart of an echo-cancellation method that can be implemented in the echo-cancellation circuit of FIG. 3 according to an embodiment.

FIG. 4 shows a flowchart of an echo-cancellation method 400 that can be implemented in circuit 300 (FIG. 3) according to an embodiment.

At step 402 of method 400, circuit 300 receives input signals 232$_1$-232$_N$ and 238.

Signal 238, which is denoted as r, can be expressed using Eq. (1) as follows:

$$r = \vec{h} \cdot \vec{x}' + z \quad (1)$$

where the vector $\vec{h}$ denotes the transfer function between the outputs of power amplifiers 266$_1$-266$_N$ (FIG. 2B) and the output of ADC 240 (FIG. 2A); vector $\vec{x}'$ denotes the vector of signals 288$_1$-288$_N$ (FIG. 2B); and z is a scalar noise component. Each of vectors $\vec{h}$ and $\vec{x}'$ is an N-component column vector. The n-th component of vector $\vec{x}'$ can be expressed as follows:

$$x' = u + w_n \quad (2)$$

where u is the amplified signal corresponding to signal 212 (FIGS. 2A-2B); and $w_n$ denotes the noise component 272$_n$ (FIG. 2B).

The vector $\vec{x}$ of signals 232$_1$-232$_N$ can be expressed using Eq. (3) as follows:

$$\vec{x} = A\vec{x}' \quad (3)$$

where A is an N×N matrix representing the transfer function between the outputs of power amplifiers 266$_1$-266$_N$ (FIG. 2B) and the outputs of ADCs 280$_1$-280$_N$ (FIG. 2B). In most cases, the matrix A can be approximated by a diagonal matrix; and the noise in the monitor-signal paths (i.e., the paths through ADCs 280$_1$-280$_N$) can be neglected.

At step 404, stage S1 of circuit 300 operates to remove the dominant echo component from the data path, thereby converting signal 238 into signal 338 (FIG. 3). Signal 338, denoted as $e^{(RDD)}$, can be approximated using Eq. (4):

$$e^{(RDD)} = r - p^{(RDD)} x_1 = r - p^{(RDD)} A_{11}(u + w_1) \quad (4)$$

where $p^{(RDD)}$ is the filter coefficient used in filter 340$_1$ (FIG. 3); $x_1$ is the first component of the vector $\vec{x}$ (Eq. (3)); $A_{11}$ is the first diagonal matrix element of the matrix A; and $w_1$ denotes the noise component 272$_1$ (see FIG. 2B).

In an example embodiment, controller 334$_1$ operates to minimize the power of signal 338 and, as such, converges on the $p^{(RDD)}$ value that can be approximated by Eq. (5):

$$p^{(RDD)} = \frac{\vec{h} \cdot \vec{1}}{A_{11}} \quad (5)$$

where $\vec{1}$ denotes an N-component column vector, each element of which is one. Using the $p^{(RDD)}$ value given by Eq. (5), Eq. (4) can be transformed into Eq. (6):

$$e^{(RDD)} = \sum_{n=2}^{N} h_n(w_n - w_1) + z \quad (6)$$

where $h_n$ is the n-th component of the vector $\vec{h}$.

Inspection of Eq. (6) reveals that adaptive filter 330$_1$ (FIG. 3) configured to operate in the above-indicated manner removes the dominant echo signal representing signal 212 from the data path. However, signal 338 is still corrupted by the echo terms proportional to the noise differences ($w_n - w_1$), a scaled sum of which represents the above-mentioned residual echo signal.

At step 406, stage S1 of circuit 300 operates to remove the dominant echo component from the monitoring paths, thereby converting signals 232$_2$-232$_N$ into signals 332$_2$-332$_N$, respectively (also see FIG. 3). Signal 332$_n$, denoted as $e_n^{(RDM)}$, can be approximated using Eq. (7):

$$e_n^{(RDM)} = x_n - p_n^{(RDM)} x_1 = A_{nn}(u + w_n) - p_n^{(RDM)} A_{11}(u + w_1) \quad (7)$$

where $x_n$ is the n-th component of the vector $\vec{x}$ (Eq. (3)); $p_n^{(RDM)}$ is the filter coefficient used in filter 340$_n$ (FIG. 3); and $A_{nn}$ is the n-th diagonal matrix element of the matrix A, where n=2, . . . , N.

In an example embodiment, controller 334$_n$ operates to minimize the power of signal 332$_n$ and, as such, converges on the $p_n^{(RDM)}$ value that can be approximated by Eq. (8):

$$p_n^{(RDM)} = \frac{A_{nn}}{A_{11}} \quad (8)$$

where n=2, . . . , N. Using the $p_n^{(RDM)}$ value given by Eq. (8), Eq. (7) can be transformed into Eq. (9):

$$e_n^{(RDM)} = A_{nn}(w_n - w_1) \quad (9)$$

At step 408, stage S2 of circuit 300 operates to remove the residual echo signal from the data path, thereby converting signal 338 into signal 222 (also see FIG. 3). Signal 222, denoted as $e^{(RSD)}$, can be approximated using Eq. (10):

$$e^{(RSD)} = e^{(RDD)} - \sum_{n=2}^{N} p_n^{(RSD)} e_n^{(RDM)} \quad (10)$$

where $p_n^{(RSD)}$ denotes the set of filter coefficients used in filter 320 (FIG. 3). In an example embodiment, controller 314 operates to minimize the power of signal 222 and, as such, converges on the $p_n^{(RSD)}$ values that can be approximated by Eq. (11):

$$p_n^{(RSD)} = \frac{h_n}{A_{nn}} \qquad (11)$$

where n=2, . . . , N. Substituting Eqs. (6), (9), and (11) into Eq. (10), one arrives at the following result:

$$e^{(RSD)} = z \qquad (12)$$

This result indicates that circuit 300 is theoretically capable of fully removing the echo signal from the receive data path of transceiver 200.

Referring back to FIG. 3, circuit 300 is typically configured to update the filter coefficients in filters 320 and $340_1$-$340_N$ in parallel at the same rate. However, in an alternative embodiment, it is possible to reduce the amount of computations by implementing a configuration in which the filter coefficients used in filters 320 and $340_2$-$340_N$ (see Eqs. (8) and (11)) are updated at a lower rate than the filter coefficient used in filter $340_1$ (see Eq. (5)). The corresponding change in the circuit structure shown in FIG. 3 includes connecting the filter controller $334_1$ to receive as an input the digital signal 222 instead of the digital signal 338. In circuit 300 modified in this manner, the filter coefficients used in filters 320 and $340_2$-$340_N$ are fixed for a period of time, while the filter coefficient used in filter $340_1$ is frequently updated. If the transfer functions $\vec{h}$ and/or A change during that period of time, then the filter coefficients used in filters 320 and $342_2$-$342_N$ will less precisely match the echo-channel conditions. However, the frequent adjustment of the filter coefficient used in filter $340_1$ can still provide for a fairly accurate cancellation of the dominant echo component, u (see Eq. (2)). As transfer-function changes build up, an eventual update of the filter coefficients used in filters 320 and $340_2$-$340_N$ can rebalance the configurations of the stages S1 and S2.

Figure 5A:
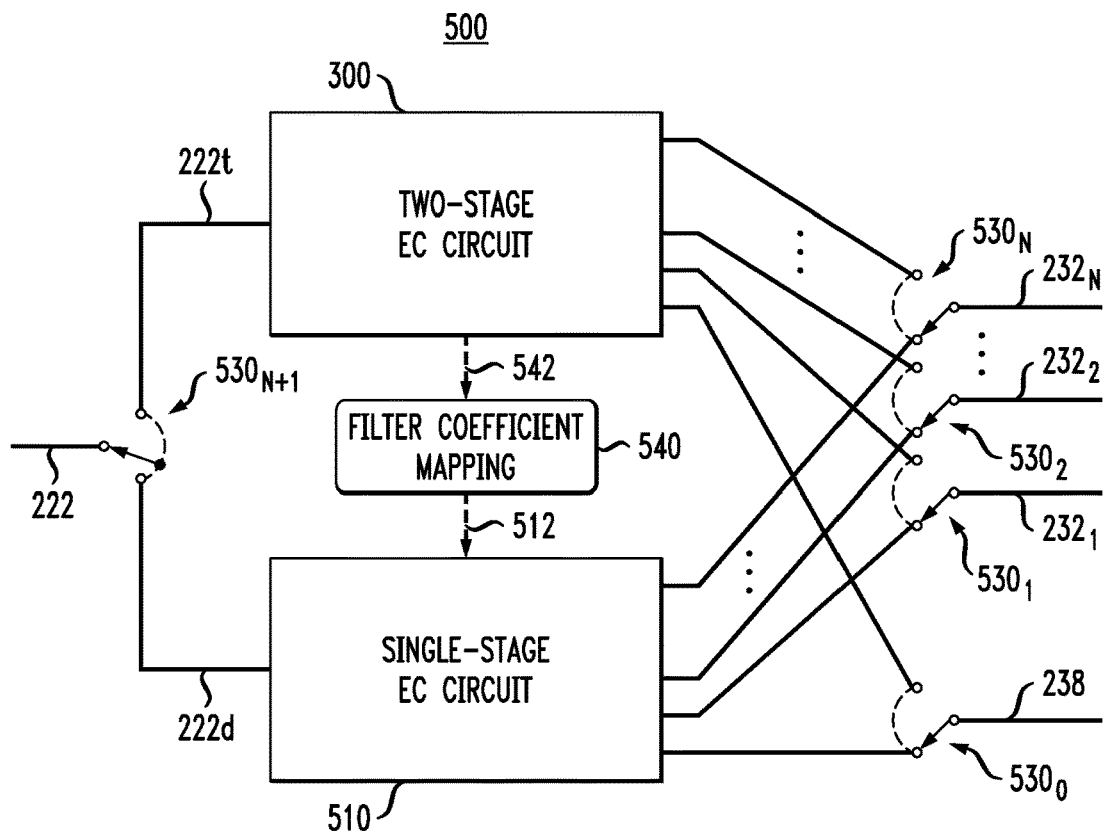
FIGS. 5A-5B show block diagrams of an echo-cancellation circuit that can be used in the multiport data transceiver of FIG. 2 according to another embodiment.
Figure 5B:
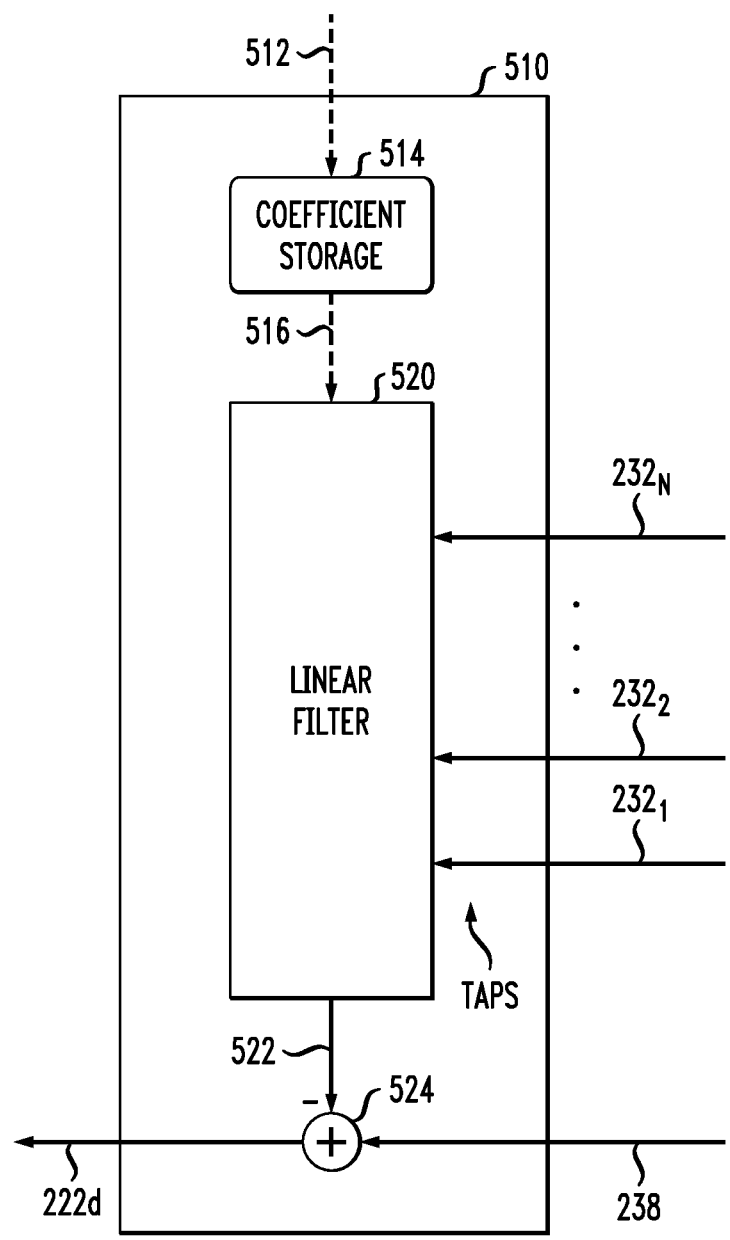

FIGS. 5A-5B show block diagrams of an echo-cancellation circuit 500 that can be used in transceiver 200 (FIG. 2) according to another embodiment. More specifically, FIG. 5A shows an overall block diagram of circuit 500. FIG. 5B shows a block diagram of a circuit 510 used in circuit 500. Circuit 500 can be used to implement the combination of echo-prediction circuit 230 and adder 224 in transceiver 200 (see FIG. 2A). Digital signals 238, $232_1$-$232_N$, and 222 are also shown in FIG. 5A to better illustrate the relationship between the circuits shown in FIGS. 5A and 2A.

Referring to FIG. 5A, circuit 500 has two parallel signal-processing paths, one of which has an embodiment of the two-stage echo-cancellation (EC) circuit 300 (FIG. 3), and the other one of which has a single-stage EC circuit 510 (also see FIG. 5B). Circuit 500 also has a plurality of switches $530_0$-$530_{N+1}$ that can be used to engage one of the two signal-processing paths while disengaging the other path. For example, in a first state of switches $530_0$-$530_{N+1}$, circuit 300 is connected to receive input signals 238 and $232_1$-$232_N$; and the output signal 222t generated by circuit 300 is used as signal 222 in transceiver 200. In a second state of switches $530_0$-$530_{N+1}$, circuit 510 is connected to receive input signals 238 and $232_1$-$232_N$; and the output signal 222d generated by circuit 510 is used as signal 222 in transceiver 200.

Referring to FIG. 5B, circuit 510 comprises a vector linear filter 520, a corresponding filter controller 514, and an adder 524. Controller 514 operates to generate a control signal 516 for the filter 520 using the filter coefficients received, by way of a control signal 512, from a filter-coefficient mapper 540 (FIG. 5A). As such, controller 514 does not need and may not have a capability for running an algorithm directed at minimizing the "error" in the output signal 222d and may simply include a memory for storing therein the received filter coefficients. In response to control signal 516, filter 520 computes a sum of appropriately scaled digital signals $232_1$-$232_N$, thereby generating an echo estimate 522. Adder 524 then removes the echo estimate 522 from digital signal 238, thereby generating digital signal 222d.

Mapper 540 is configured to convert the (2N−1) filter coefficients used in circuit 300 and received therefrom by way of a control signal 542 into N filter coefficients for filter 520, with the conversion being performed in a manner that enables either of the two signal-processing paths of circuit 500 to provide substantially equivalent echo cancellation under equivalent echo-channel conditions. In an example embodiment, coefficient mapper 540 can be configured to compute the filter coefficients ($p_1, p_2, \ldots, p_N$) for use in filter 520 in accordance with Eqs. (13a)-(13b):

$$p_1 = p^{(RDD)} - \sum_{n=2}^{N} p_n^{(RDM)} p_n^{(RSD)} \qquad (13a)$$

$$p_n = p_n^{(RSD)}, \text{ where } n = 2, \ldots, N \qquad (13b)$$

where the coefficients $p^{(RDD)}$, $p_n^{(RSD)}$, and $p_N^{(RDM)}$ are described above in reference to Eqs. (1)-(11).

FIG. 6 shows a flowchart of an echo-cancellation method 600 that can be implemented in circuit 500 (FIG. 5) according to an embodiment.

At step 602 of method 600, circuit 500 receives input signals $232_1$-$232_N$ and 238 in a given slot.

As used herein, the term "slot" refers to an upstream transmission opportunity that may be granted to a cable modem, such as a cable modem 130 (FIG. 1). Such a slot may be defined using a specified interval of time and/or frequency. For example, a slot may comprise (i) a time interval corresponding to a single OFDM symbol and (ii) a subset of OFDM tones (subcarriers) in frequency.

At step 604, it is determined whether the slot is a payload-data slot or a training (e.g., pilot-data) slot. If it is determined that the slot is a training slot, then the processing of method 600 is directed to step 606. If it is determined that the slot is a payload-data slot, then the processing of method 600 is directed to step 614.

At step 606, switches $530_0$-$530_{N+1}$ are configured to be in a first state, thereby engaging circuit 300. As already mentioned above, circuit 510 is disengaged from signal processing in this circuit configuration.

At step 608, circuit 300 operates to process the corresponding input signals $232_1$-$232_N$ and 238, e.g., as described above in reference to FIGS. 3-4. This processing produces, inter alia, the set of filter coefficients $p^{(RDD)}$, $p_n^{(RSD)}$, and $p_n^{(RDM)}$.

In an example embodiment, access node 110 operates to cause cable modems 130 to transmit no power during the training slots. This system configuration may be beneficial in that it typically reduces statistical variation in the values of the filter coefficients on which the filter controllers of circuit 300 converge. However, in some embodiments, a cable modem 130 may still transmit some data during a training slot.

At step 610, mapper 540 converts the set of filter coefficients $p^{(RDD)}$, $p_n^{(RSD)}$, and $p_n^{(RDM)}$ produced at step 608 into the corresponding set of filter coefficients $(p_1, p_2, \ldots, p_N)$ for filter 520. In an example embodiment, the conversion can be performed in accordance with Eqs. (13a)-(13b).

At step 612, mapper 540 uses control signal 512 to store the filter coefficients $(p_1, p_2, \ldots, p_N)$ generated at step 610 in the memory of filter controller 514 (FIG. 5B).

At step 614, switches $530_0$-$530_{N+1}$ are configured to be in a second state, thereby engaging circuit 510. As already mentioned above, circuit 300 is disengaged from signal processing in this circuit configuration.

At step 616, filter 510 operates to process the corresponding input signals $232_1$-$232_N$ and 238, e.g., as described above in reference to FIG. 5B using the filter coefficients of step 612.

The use of circuit 500 and method 600 may be beneficial in some embodiments of transceiver 200 for at least some of the following reasons.

Under typical operating conditions, the echo channel in transceiver 200 (FIG. 2A) is characterized by a relatively large value of the condition number C, which can be, e.g., in the range between $10^4$ and $10^5$. A conventional single-stage adaptive filter subjected to such echo-channel conditions may take an unacceptably long time to converge on an optimal set of filter coefficients $(p_1, p_2, \ldots, p_N)$. A conventional single-stage adaptive filter may also be unable to quickly react to changing echo-channel conditions, thereby failing to maintain sufficiently high level of performance at all times.

In contrast, circuit 300 is capable of converging on an optimal set of filter coefficients $p^{(RDD)}$, $p_n^{(RSD)}$, and $p_n^{(RDM)}$ relatively quickly, in part because the stage S1 thereof preconditions the input signals to the stage S2 such that the corresponding effective echo channel to which the stage S2 is exposed has a relatively small condition number, e.g., typically C≈N. The latter enables adaptive filter 310 in stage S2 to quickly converge on an optimal set of filter coefficients $p_n^{(RSD)}$ and also quickly react to changing echo-channel conditions. However, circuit 300 is able to provide these benefits at the expense of somewhat greater required processing/computing power than that needed for a corresponding conventional single-stage adaptive filter. Accordingly, circuit 500 and method 600 can be used, e.g., as described above, to achieve a beneficial trade-off between (i) accurate channel tracking with fast convergence and (ii) the overall required processing/computing power.

FIGS. 7-10 illustrate several multistage echo cancellers that can be used in additional embodiments of transceiver 200. From the provided description, a person of ordinary skill in the art will understand, without any undue experimentation, how to make and use such multistage echo cancellers.

Figure 7A:
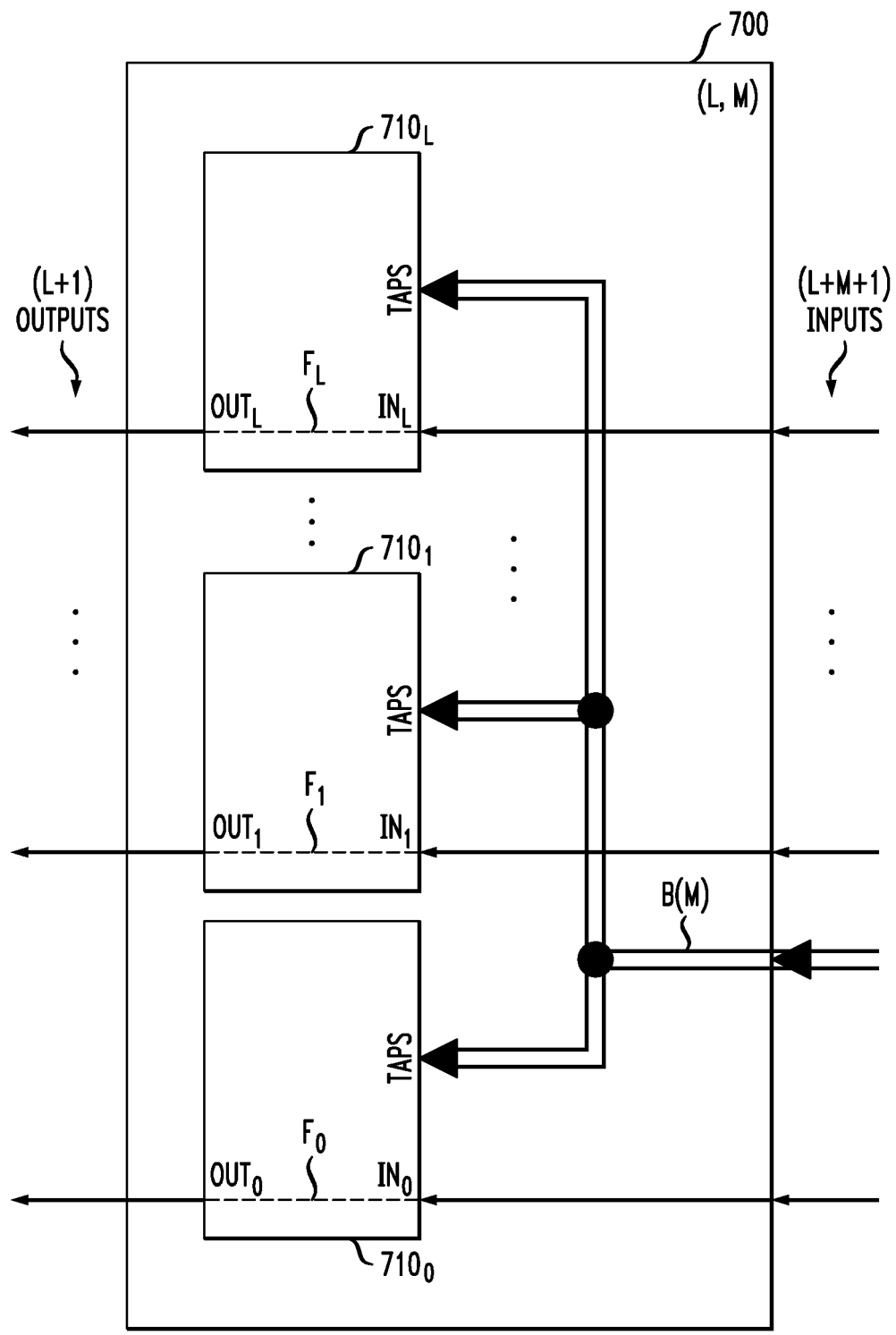
FIGS. 7A-7B show block diagrams of an echo-cancellation stage that can be used in the multiport data transceiver of FIG. 2 according to an embodiment.
Figure 7B:
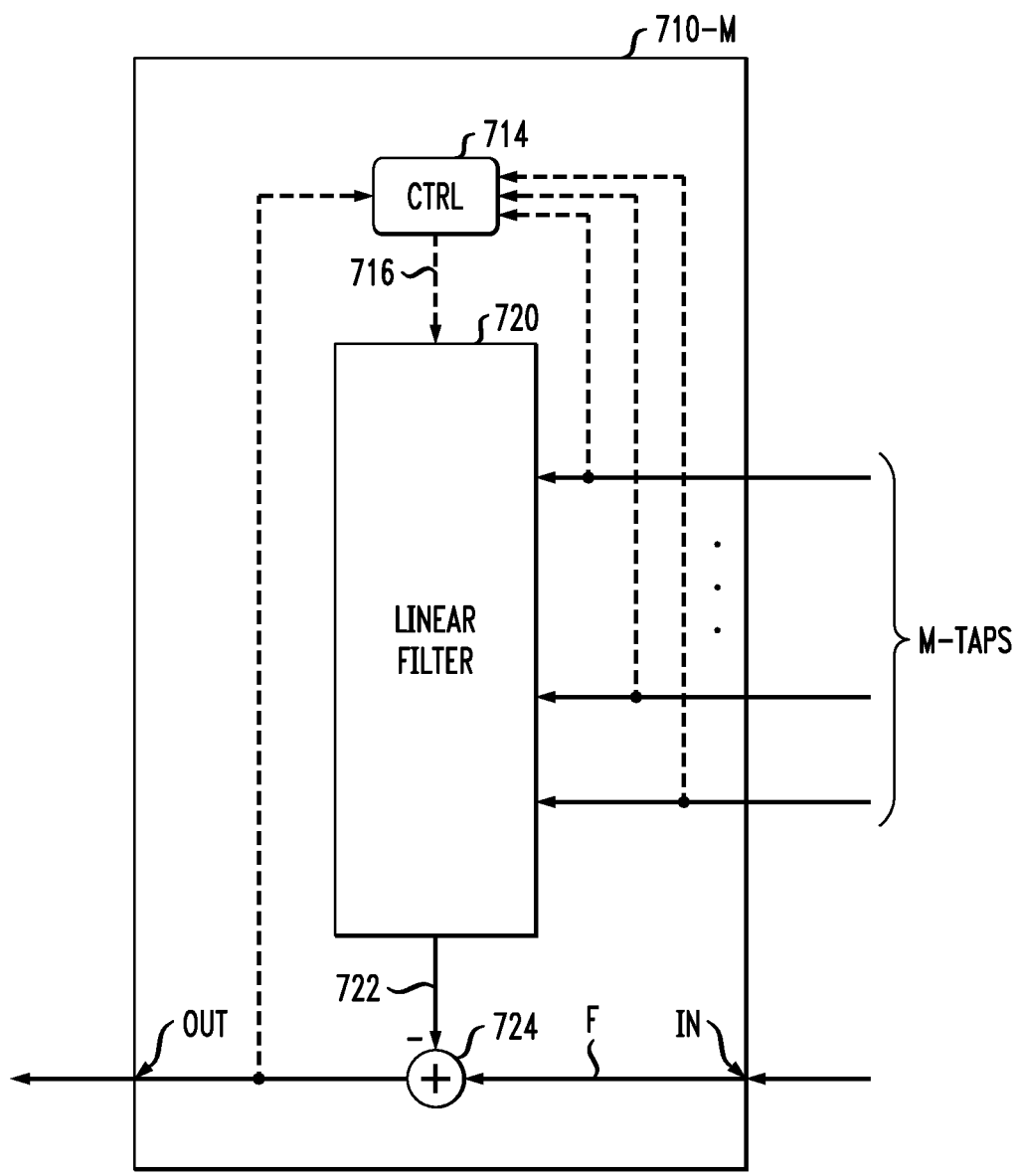

FIGS. 7A-7B show block diagrams of an echo-cancellation stage 700 that can be used in transceiver 200 according to an embodiment. More specifically, FIG. 7A shows an overall block diagram of stage 700. FIG. 7B show a block diagram of an adaptive filter 710, one or more of which can be used in stage 700. Various embodiments of stage 700 can be used to implement various embodiments of a multistage echo canceller for transceiver 200. Several illustrative examples of such a multistage echo canceller are described below in reference to FIGS. 8-10.

Various embodiments of stage 700 can be characterized using two numbers, denoted L and M, respectively. An embodiment of stage 700 corresponding to the specific numbers L and M can be denoted as 700-(L,M), where L can be 0, 1, 2, and so on; and M can be 1, 2, and so on. A stage 700-(L,M) (FIG. 7A) has (L+1) adaptive filters 710-M (FIG. 7B), which are labeled in FIG. 7A using the reference numerals $710_0$-$710_L$. Thus, at the very minimum, a stage 700-(L,M) has one adaptive filter 710-M, in which case L=0. An adaptive filter 710-M has M taps (see FIG. 7B). Thus, at the very minimum, adaptive filter 710-M has one tap, in which case M=1. An adaptive filter 710-M also has a feed-through path F that goes through an input port IN, an adder 724, and an output port OUT.

In operation, a filter controller (CTRL) 714 of filter 710-M generates a control signal 716 for the linear filter 720 in response to the M signals applied to the M taps and using the signal generated at the output port OUT. In an example embodiment, controller 714 generates control signal 716 using a suitable algorithm directed at minimizing the "error" in the output signal generated at the output port OUT using a suitable minimization algorithm. In response to control signal 716, the linear filter 720 computes a sum of appropriately scaled signals applied to the M taps, thereby generating a corresponding digital signal 722. Adder 724 then subtracts digital signal 722 from the digital signal received at the input port IN, thereby generating the digital signal outputted through the output port OUT.

Stage 700-(L,M) is configured to receive (L+M+1) input signals and to generate (L+1) output signals. M of the (L+M+1) received input signals are applied to a bus B(M) that is configured to apply copies of these signals to the M taps of each of the adaptive filters $710_0$-$710_L$ as indicated in FIG. 7A. The remaining (L+1) of the (L+M+1) received input signals are applied to the feed-through paths $F_0$-$F_L$ of the adaptive filters $710_0$-$710_L$, respectively. The output signals generated at the output ports $OUT_0$-$OUT_L$ of the adaptive filters $710_0$-$710_L$, respectively, are the (L+1) output signals of the stage 700-(L,M).

Stage S1 of circuit 300 (see FIG. 3) is an example of the stage 700-(N−1,1), i.e., L=N−1 and M=1. Stage S2 of circuit 300 (also see FIG. 3) is an example of the stage 700-(0,N−1), i.e., L=0 and M=N−1.

Figure 8:
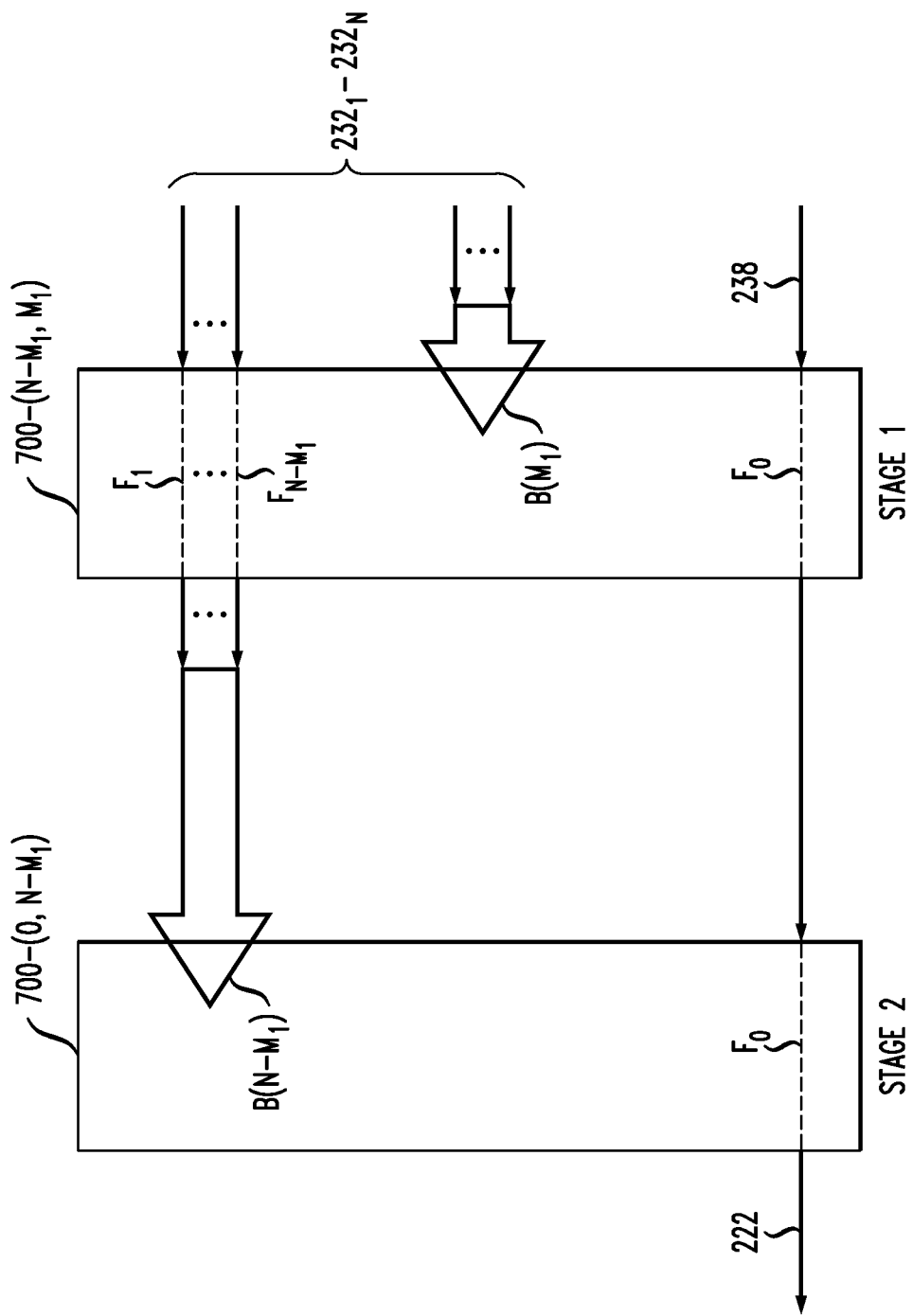
FIG. 8 shows a block diagram of an echo-cancellation circuit that can be used in the multiport data transceiver of FIG. 2 according to yet another embodiment.

FIG. 8 shows a block diagram of an echo-cancellation circuit 800 that can be used in transceiver 200 (FIG. 2) according to yet another embodiment. More specifically, circuit 800 can be used to implement the combination of echo-prediction circuit 230 and adder 224 in transceiver 200 (see FIG. 2A). Digital signals 238, $232_1$-$232_N$, and 222 are also shown in FIG. 8 to better illustrate the relationship between the circuits shown in FIGS. 8 and 2A.

Circuit 800 comprises stages 700-(N−$M_1$,$M_1$) and 700-(0,N−$M_1$), wherein the stage 700-(N−$M_1$,$M_1$) acts as a first stage, and the stage 700-(0,N−$M_1$) acts as a second stage, where $M_1$ is the number of taps in each of the adaptive filters 710-$M_1$ used in the first stage (also see FIG. 7B).

Digital signal 238 (also see FIG. 2A) is applied to the feed-through path $F_0$ of the first stage. The remaining inputs of the first stage are configured to receive digital signals $232_1$-$232_N$ as indicated in FIG. 8. More specifically, N−$M_1$ of the received digital signals $232_1$-$232_N$ are applied to the feed-through paths $F_1$-$F_{N-M_1}$ of the first stage. The remaining $M_1$ of the received digital signals $232_1$-$232_N$ are applied to the bus B($M_1$) of the first stage.

The feed-through path $F_0$ of the second stage is connected to the output of the feed-through path $F_0$ of the first stage. The output of the feed-through path $F_0$ of the second stage is digital signal 222 (also see FIG. 2A). The outputs of the feed-through paths $F_1$-$F_{N-M1}$ of the first stage are applied to the bus $B(N-M_1)$ of the second stage.

In operation, the first stage of circuit 800 can be configured to remove $M_1$ dominant echo signals. The second stage then operates to remove the residual echo signal that remains after the removal of the dominant echo signals performed by the first stage.

An embodiment of circuit 800 corresponding to $M_1=1$ is circuit 300 (FIG. 3).

Figure 9:
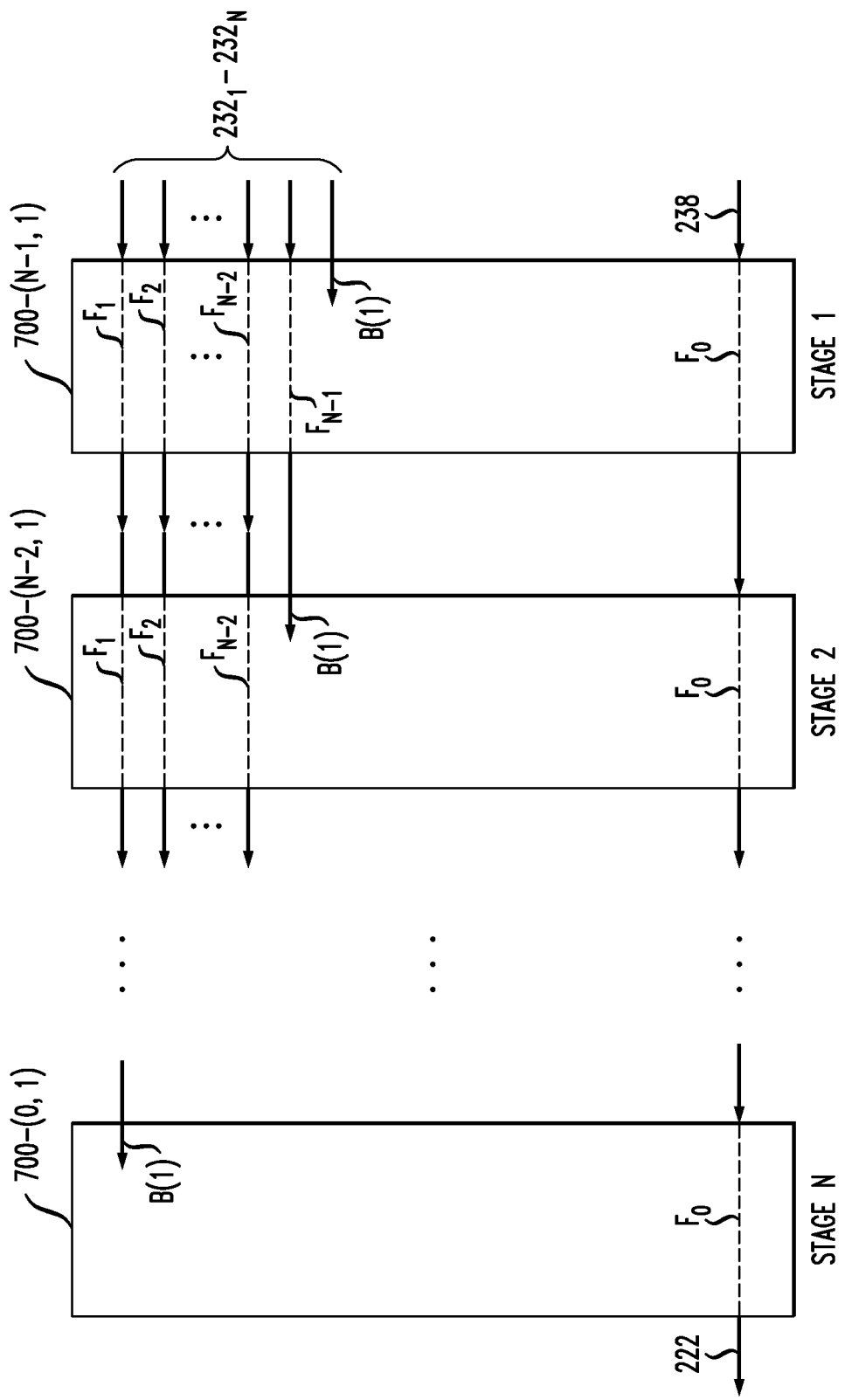
FIG. 9 shows a block diagram of an echo-cancellation circuit that can be used in the multiport data transceiver of FIG. 2 according to yet another embodiment.

FIG. 9 shows a block diagram of an echo-cancellation circuit 900 that can be used in transceiver 200 (FIG. 2) according to yet another embodiment. More specifically, circuit 900 can be used to implement the combination of echo-prediction circuit 230 and adder 224 in transceiver 200 (see FIG. 2A). Digital signals 238, 232$_1$-232$_N$, and 222 are also shown in FIG. 9 to better illustrate the relationship between the circuits shown in FIGS. 9 and 2A.

Circuit 900 comprises N stages 700, wherein the stage 700-(N−1,1) acts as the first stage; the stage 700-(N−2,1) acts as the second stage, and so on; and the stage 700-(0,1) acts as the N-th stage.

Digital signal 238 (also see FIG. 2A) is applied to the feed-through path $F_0$ of the first stage. The remaining inputs of the first stage are configured to receive digital signals 232$_1$-232$_N$ as indicated in FIG. 9. More specifically, (N−1) of the received digital signals 232$_1$-232$_N$ are applied to the feed-through paths $F_1$-$F_{N-1}$ of the first stage. The remaining one of the received digital signals 232$_1$-232$_N$ is applied to the bus B(1) of the first stage.

Each of the subsequent stages 700 in circuit 900 has one less feed-through path than the preceding stage 700 and, as such, is configured to connect one of the signals fed through the preceding stage 700 to the bus B(1) thereof. The remaining signals fed through the preceding stage 700 are connected to the respective feed-through paths of the subsequent stage, as indicated in FIG. 9. The output of the feed-through path $F_0$ of the N-th stage is the digital signal 222 (also see FIG. 2A).

In operation, the stages of circuit 900 can be configured to sequentially remove various echo signals, e.g., in the order of their prominence in the overall echo signal.

Figure 10:
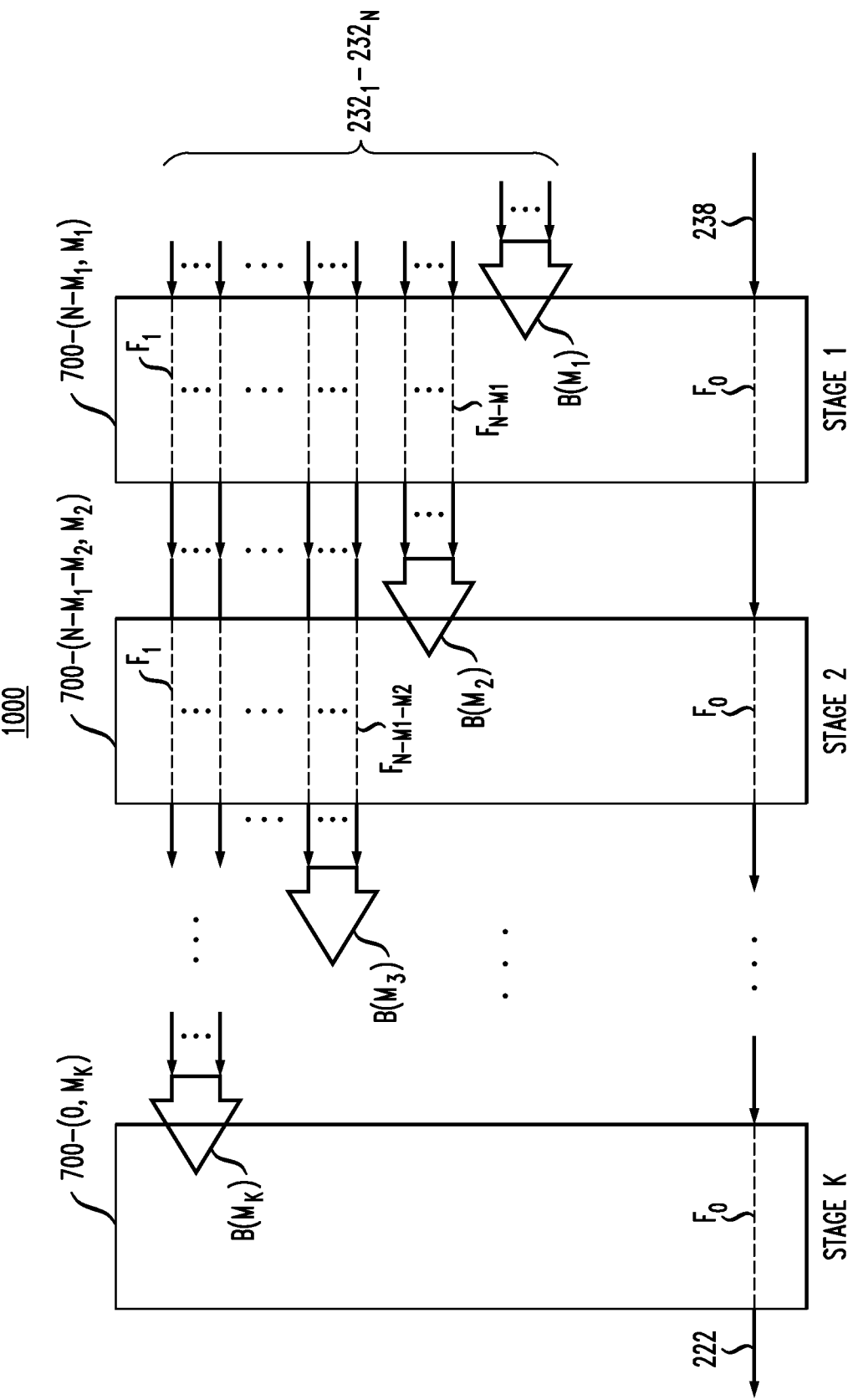
FIG. 10 shows a block diagram of an echo-cancellation circuit that can be used in the multiport data transceiver of FIG. 2 according to yet another embodiment.

FIG. 10 shows a block diagram of an echo-cancellation circuit 1000 that can be used in transceiver 200 (FIG. 2) according to yet another embodiment. More specifically, circuit 1000 can be used to implement the combination of echo-prediction circuit 230 and adder 224 in transceiver 200 (see FIG. 2A). Digital signals 238, 232$_1$-232$_N$, and 222 are also shown in FIG. 10 to better illustrate the relationship between the circuits shown in FIGS. 10 and 2A.

Circuit 1000 comprises K stages 700, wherein the stage 700-(N−$M_1$,$M_1$) acts as the first stage; the stage 700-(N−$M_1$-$M_2$,$M_2$) acts as the second stage, and so on; and the stage 700-(0,$M_K$) acts as the K-th stage, where $$\sum_{k=1}^{K} M_k = N.$$

In some embodiments, all of the numbers $M_k$ may be different. In some other embodiments, at least some or all of the numbers $M_k$ may be the same. An embodiment of circuit 1000 corresponding to $M_k=1$ is circuit 900 (FIG. 9).

Digital signal 238 (also see FIG. 2A) is applied to the feed-through path $F_0$ of the first stage. The remaining inputs of the first stage are configured to receive digital signals 232$_1$-232$_N$ as indicated in FIG. 10. More specifically, N−$M_1$ of the received digital signals 232$_1$-232$_N$ are applied to the feed-through paths $F_1$-$F_{N-M1}$ of the first stage. The remaining $M_1$ of the received digital signals 232$_1$-232$_N$ are applied to the bus $B(M_1)$ of the first stage.

A k-th stage 700 in circuit 1000 reduces the number of feed-through signals by $M_k$. The corresponding $M_k$ input signals are terminated in the k-th stage 700 due to being connected to the bus $B(M_k)$ thereof.

The output of the feed-through path $F_0$ of the K-th stage is the digital signal 222 (also see FIG. 2A).

In operation, the stages of circuit 1000 can be configured to sequentially remove groups of echo signals, e.g., in the order of the groups' prominence in the overall echo signal.

Although various embodiments have been described above in reference to a transceiver (e.g., 200, FIG. 2A) having an electrical analog front end (e.g., comprising FEMs 260$_1$-260$_N$, FIG. 2A), the invention(s) disclosed herein are not so limited. For example, in some alternative embodiments, the corresponding transceiver may have an analog front end that is not "purely" electrical. More specifically, in some of such alternative embodiments, FEMs 260$_1$-260$_N$ can be replaced by electro-acoustic circuits capable of inter-converting electrical and acoustic signals such that: (i) electrical signals applied to such electro-acoustic circuits by digital transmit chain 210 are converted into the corresponding acoustic signals, which are then transmitted on ports 112$_1$-112$_N$ and (ii) acoustic signals received on ports 112$_1$-112$_N$ are converted into the corresponding electrical signals 258$_1$-258$_N$ for inputting into digital receive chain 210. In some other ones of such alternative embodiments, FEMs 260$_1$-260$_N$ can be replaced by electro-optical circuits capable of inter-converting electrical and optical signals such that: (i) electrical signals applied to such electro-optical circuits by digital transmit chain 210 are converted into the corresponding optical signals, which are then transmitted on ports 112$_1$-112$_N$ and (ii) optical signals received on ports 112$_1$-112$_N$ are converted into the corresponding electrical signals 258$_1$-258$_N$ for inputting into digital receive chain 210.

According to an example embodiment disclosed above, e.g., in the summary section and/or in reference to any one or any combination of some or all of FIGS. 1-10, provided is an apparatus (e.g., 110, FIG. 1; 200, FIG. 2A) comprising a data transceiver that comprises an analog front end (e.g., 260$_1$-260$_N$, FIG. 2A) having a plurality of ports (e.g., 112$_1$-112$_N$, FIG. 2A), a digital transmit chain (e.g., 210, FIG. 2A), and a digital receive chain (e.g., 210, FIG. 2A), the digital transmit chain being configured to drive the analog front end to cause an output signal (e.g., corresponding to 212, FIG. 2A) to be transmitted on the plurality of ports with some energy of the output signal being coupled through the analog front end into the digital receive chain as an echo signal; wherein the data transceiver further comprises a first echo-cancellation circuit (e.g., 300, FIGS. 3, 5A; 800, FIG. 8; 900, FIG. 9; 1000, FIG. 10) having at least a first stage and a second stage (e.g., S1, S2, FIG. 3; 700, FIGS. 8-10) connected in series, the first echo-cancellation circuit being configurable to cancel the echo signal in response to a plurality of monitor signals (e.g., 232$_1$-232$_N$, FIGS. 2A, 3) received from the analog front end; wherein the first stage comprises a plurality of first adaptive filters (e.g., 330$_1$-330$_N$, FIG. 3; 710$_1$-710$_L$, FIG. 7A), each of the first adaptive filters having a respective feed-through path (e.g., through 344, FIG. 3; F, FIG. 7B) and a respective first tap, each of the respective first taps being connected to receive one (e.g., $232_1$, FIGS. 3, 9) of the plurality of monitor signals, one (e.g., through $344_1$, FIG. 3; $F_0$, FIG. 9) of the respective feed-through paths being connected to receive a data signal (e.g., 238, FIGS. 3, 9) generated in response to one or more input signals received on the plurality of ports, and other ones (e.g., through $344_2$-$344_N$, FIG. 3; $F_1$-$F_{N-1}$, FIG. 9) of the respective feed-through paths being connected to receive other ones (e.g., $232_2$-$232_N$, FIGS. 3, 9) of the plurality of monitor signals; and wherein the second stage is connected to receive signals (e.g., 338, $332_2$-$332_N$, FIG. 3) outputted by the respective feed-through paths of the plurality of first adaptive filters.

In some embodiments of the above apparatus, the second stage comprises a second adaptive filter (e.g., 310, FIG. 3) having a feed-through path (e.g., through 324, FIG. 3) and a plurality of taps; wherein the feed-through path of the second adaptive filter is connected to receive a signal (e.g., 338, FIG. 3) outputted by said one of the respective feed-through paths of the plurality of first adaptive filters; and the plurality of taps of the second adaptive filter are connected to receive signals (e.g., $332_2$-$332_N$, FIG. 3) outputted by said other ones of the respective feed-through paths of the plurality of first adaptive filters.

In some embodiments of any of the above apparatus, the second stage comprises a plurality of second adaptive filters (e.g., $710_1$-$710_L$, FIG. 7A), each having a respective feed-through path (e.g., F, FIG. 7B) and a respective plurality of taps; wherein the respective feed-through path of one of the plurality of second adaptive filters is connected to receive a signal outputted by said one (e.g., $F_0$ of Stage 1, FIG. 9) of the respective feed-through paths of the plurality of first adaptive filters; wherein the respective feed-through paths of other ones of the plurality of second adaptive filters are connected to receive signals outputted by a first subset (e.g., $F_1$-$F_{N-2}$ of Stage 1, FIG. 9) of said other ones of the respective feed-through paths of the plurality of first adaptive filters; and wherein each of the respective plurality of taps of the plurality of second adaptive filters are connected to receive signals outputted by a second subset (e.g., $F_{N-1}$ of Stage 1, FIG. 9) of said other ones of the respective feed-through paths of the plurality of first adaptive filters.

In some embodiments of any of the above apparatus, the second subset has a single feed-through path; and wherein the first and second subsets have no feed-through paths in common.

In some embodiments of any of the above apparatus, each of the first adaptive filters has a respective second tap (e.g., connected to $B(M_1)$, where $M_1 \geq 2$, FIG. 8); and wherein each of the respective second taps is connected to receive another one of the plurality of monitor signals.

In some embodiments of any of the above apparatus, the first echo-cancellation circuit has a third stage (e.g., Stage N, FIG. 9; Stage K, FIG. 10) connected in series with the first and second stages thereof.

In some embodiments of any of the above apparatus, the data transceiver further comprises a second echo-cancellation circuit (e.g., 510, FIG. 5A) and one or more switches (e.g., 530, FIG. 5A); wherein the second echo-cancellation circuit is configurable to cancel the echo signal in response to the plurality of monitor signals received from the analog front end; wherein, in a first configuration of the one or more switches, the first echo-cancellation circuit is connected to receive the plurality of monitor signals while the second echo-cancellation circuit is disconnected therefrom; and wherein, in a second configuration of the one or more switches, the second echo-cancellation circuit is connected to receive the plurality of monitor signals while the first echo-cancellation circuit is disconnected therefrom.

In some embodiments of any of the above apparatus, the data transceiver further comprises a filter-coefficient mapper (e.g., 540, FIG. 5A) configured to determine (e.g., at 610, FIG. 6) filter coefficients for the second echo-cancellation circuit in response to receiving filter coefficients used in the first and second stages of the first echo-cancellation circuit.

In some embodiments of any of the above apparatus, the second echo-cancellation circuit is configured to use fewer filter coefficients than a total number of the filter coefficients used in the first and second stages of the first echo-cancellation circuit (e.g., in accordance with Eqs. (13a)-(13b)).

In some embodiments of any of the above apparatus, the second echo-cancellation circuit comprises a second adaptive filter (e.g., 510, FIG. 5B) that comprises a filter controller (e.g., 514, FIG. 5B) and a plurality of taps (e.g., TAPS, FIG. 5B); and wherein the filter controller is configured to: store therein (e.g., at 612, FIG. 6) the filter coefficients determined by the filter-coefficient mapper; and cause the second adaptive filter to apply (e.g., at 616, FIG. 6) the filter coefficients stored in the filter controller to signals applied to the plurality of taps thereof in the second configuration of the one or more switches.

In some embodiments of any of the above apparatus, the first echo-cancellation circuit is configured to update filter coefficients used in a first subset (e.g., $330_2$-$330_N$, FIG. 3) of the plurality of first adaptive filters at a first rate; and wherein the first echo-cancellation circuit is configured to update one or more filter coefficients used in a second subset (e.g., $330_k$, FIG. 3) of the plurality of first adaptive filters at a second rate that is different from the first rate.

In some embodiments of any of the above apparatus, the second stage comprises a second adaptive filter (e.g., 310, FIG. 3); and wherein the first echo-cancellation circuit is configured to update filter coefficients used in the second adaptive filter at the first rate.

In some embodiments of any of the above apparatus, the second rate is higher than the first rate.

In some embodiments of any of the above apparatus, the data transceiver further comprises a signal combiner (e.g., 250, FIG. 2A) configured to combine two or more of the input signals received on the plurality of ports to generate a corresponding combined signal (e.g., 248, FIG. 2A); and wherein the data transceiver is configured to generate the data signal in response to the combined signal.

In some embodiments of any of the above apparatus, the data transceiver is configured to broadcast the output signal on the plurality of ports.

In some embodiments of any of the above apparatus, the analog front end comprises a plurality of power amplifiers (e.g., $266_n$, FIG. 2B), each connected between the digital transmit chain and a respective one of the plurality of ports.

In some embodiments of any of the above apparatus, the analog front end comprises a plurality of electrical couplers (e.g., $276_n$, FIG. 2B), each connected to an output of a respective one of the plurality of power amplifiers and configured to generate a respective one of the plurality of monitor signals.

In some embodiments of any of the above apparatus, the apparatus further comprises a cable modem termination system (e.g., CMTS 110, FIG. 1) that includes the data transceiver.

In some embodiments of any of the above apparatus, each of the plurality of ports is configured to be connected to a respective coaxial cable.

In some embodiments of any of the above apparatus, each of the respective coaxial cables is connected to a different respective distribution plant (e.g., $120_n$, FIG. 1).

In some embodiments of any of the above apparatus, the output signal transmitted on the plurality of ports is an electrical, optical, or acoustic output signal; and wherein each of the one or more input signals received on the plurality of ports is a respective electrical, optical, or acoustic input signal.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
a data transceiver that comprises an analog front end having a plurality of front-end modules connected to a plurality of ports, a digital transmit chain, and a digital receive chain, the digital transmit chain being configured to drive the analog front end to cause an output signal to be transmitted on the plurality of ports with portions of the output signal being coupled through the front-end modules into the digital receive chain as an echo signal;
wherein the data transceiver further comprises a first echo-cancellation circuit having at least a first stage and a second stage connected in series, the first echo-cancellation circuit being configurable to cancel the echo signal in response to a plurality of monitor signals received from the front-end modules;
wherein the first stage comprises a plurality of first adaptive filters, each of the first adaptive filters having a respective feed-through path and a respective first tap, each of the respective first taps being connected to receive one of the plurality of monitor signals, one of the respective feed-through paths being connected to receive a data signal generated in response to one or more input signals received on the plurality of ports, and other ones of the respective feed-through paths being connected to receive other ones of the plurality of monitor signals; and
wherein the second stage is connected to receive signals outputted by the respective feed-through paths of the plurality of first adaptive filters.

2. The apparatus of claim 1,
wherein the second stage comprises a second adaptive filter having a feed-through path and a plurality of taps;
wherein the feed-through path of the second adaptive filter is connected to receive a signal outputted by said one of the respective feed-through paths of the plurality of first adaptive filters; and
the plurality of taps of the second adaptive filter are connected to receive signals outputted by said other ones of the respective feed-through paths of the plurality of first adaptive filters.

3. The apparatus of claim 1,
wherein the second stage comprises a plurality of second adaptive filters, each having a respective feed-through path and a respective plurality of taps;
wherein the respective feed-through path of one of the plurality of second adaptive filters is connected to receive a signal outputted by said one of the respective feed-through paths of the plurality of first adaptive filters;
wherein the respective feed-through paths of other ones of the plurality of second adaptive filters are connected to receive signals outputted by a first subset of said other ones of the respective feed-through paths of the plurality of first adaptive filters; and
wherein each of the respective plurality of taps of the plurality of second adaptive filters are connected to receive signals outputted by a second subset of said other ones of the respective feed-through paths of the plurality of first adaptive filters.

4. The apparatus of claim 3,
wherein the second subset has a single feed-through path; and
wherein the first and second subsets have no feed-through paths in common.

5. The apparatus of claim 1,
wherein each of the first adaptive filters has a respective second tap; and
wherein each of the respective second taps is connected to receive another one of the plurality of monitor signals.

6. The apparatus of claim 1, wherein the first echo-cancellation circuit has a third stage connected in series with the first and second stages thereof.

7. The apparatus of claim 1,
wherein the data transceiver further comprises a second echo-cancellation circuit and one or more switches;
wherein the second echo-cancellation circuit is configurable to cancel the echo signal in response to the plurality of monitor signals received from the front-end modules;
wherein, in a first configuration of the one or more switches, the first echo-cancellation circuit is connected to receive the plurality of monitor signals while the second echo-cancellation circuit is disconnected therefrom; and
wherein, in a second configuration of the one or more switches, the second echo-cancellation circuit is connected to receive the plurality of monitor signals while the first echo-cancellation circuit is disconnected therefrom.

8. The apparatus of claim 7, wherein the data transceiver further comprises a filter-coefficient mapper configured to determine filter coefficients for the second echo-cancellation circuit in response to receiving filter coefficients used in the first and second stages of the first echo-cancellation circuit.

9. The apparatus of claim 8, wherein the second echo-cancellation circuit is configured to use fewer filter coefficients than a total number of the filter coefficients used in the first and second stages of the first echo-cancellation circuit.

10. The apparatus of claim 8,
wherein the second echo-cancellation circuit comprises a second adaptive filter that comprises a filter controller and a plurality of taps; and
wherein the filter controller is configured to:
store therein the filter coefficients determined by the filter-coefficient mapper; and
cause the second adaptive filter to apply the filter coefficients stored in the filter controller to signals applied to the plurality of taps thereof in the second configuration of the one or more switches.

11. The apparatus of claim 1,
wherein the first echo-cancellation circuit is configured to update filter coefficients used in a first subset of the plurality of first adaptive filters at a first rate; and
wherein the first echo-cancellation circuit is configured to update one or more filter coefficients used in a second subset of the plurality of first adaptive filters at a second rate that is different from the first rate.

12. The apparatus of claim 11,
wherein the second stage comprises a second adaptive filter; and
wherein the first echo-cancellation circuit is configured to update filter coefficients used in the second adaptive filter at the first rate.

13. The apparatus of claim 12, wherein the second rate is higher than the first rate.

14. The apparatus of claim 1,
wherein the data transceiver further comprises a signal combiner configured to combine two or more of the input signals received on the plurality of ports to generate a corresponding combined signal; and
wherein the data transceiver is configured to generate the data signal in response to the combined signal.

15. The apparatus of claim 1, wherein the data transceiver is configured to broadcast the output signal on the plurality of ports.

16. The apparatus of claim 1, wherein each of the front-end modules comprises a respective power amplifier connected between the digital transmit chain and a respective one of the plurality of ports.

17. The apparatus of claim 16, wherein each of the front-end modules comprises a respective electrical coupler connected to an output of the respective power amplifier and configured to generate a respective one of the plurality of monitor signals.

18. The apparatus of claim 1, further comprising a cable modem termination system that includes the data transceiver.

19. The apparatus of claim 1, wherein each of the plurality of ports is configured to be connected to a respective coaxial cable.

20. The apparatus of claim 1,
wherein the output signal transmitted on the plurality of ports is an electrical, optical, or acoustic output signal; and
wherein each of the one or more input signals received on the plurality of ports is a respective electrical, optical, or acoustic input signal.

* * * * *